(12) United States Patent
Fomitchev et al.

(10) Patent No.: US 8,455,165 B2
(45) Date of Patent: Jun. 4, 2013

(54) CYCLIC-TREATED METAL OXIDE

(75) Inventors: Dmitry Fomitchev, Lexington, MA (US); Hairuo Tu, Boxborough, MA (US)

(73) Assignee: Cabot Corporation, Boston, MA (US)

( * ) Notice: Subject to any disclaimer, the term of this patent is extended or adjusted under 35 U.S.C. 154(b) by 1668 days.

(21) Appl. No.: 11/774,494

(22) Filed: Jul. 6, 2007

(65) Prior Publication Data

US 2008/0070143 A1    Mar. 20, 2008

Related U.S. Application Data

(60) Provisional application No. 60/844,828, filed on Sep. 15, 2006.

(51) Int. Cl.
G03G 9/097 (2006.01)

(52) U.S. Cl.
USPC ............... 430/108.7; 430/108.1; 430/108.24; 430/108.6; 106/490

(58) Field of Classification Search
USPC ..... 430/108.1, 108.24, 108.6, 108.7; 106/490
See application file for complete search history.

(56) References Cited

U.S. PATENT DOCUMENTS

| | | | |
|---|---|---|---|
| 3,900,588 A * | 8/1975 | Fisher | 430/119.81 |
| 4,845,004 A | 7/1989 | Kobayashi | |
| 4,923,520 A | 5/1990 | Anzai et al. | |
| 4,943,507 A | 7/1990 | Takahashi et al. | |
| 4,950,502 A | 8/1990 | Saam et al. | |
| 4,985,477 A | 1/1991 | Collins et al. | |
| 5,008,305 A | 4/1991 | Kennan et al. | |
| 5,009,874 A | 4/1991 | Parmentier et al. | |
| 5,013,585 A | 5/1991 | Shimizu et al. | |
| 5,024,915 A | 6/1991 | Sato et al. | |
| 5,039,736 A | 8/1991 | Fujiki | |
| 5,096,733 A | 3/1992 | Vallyathan et al. | |
| 5,135,832 A | 8/1992 | Sacripante et al. | |
| 5,194,356 A | 3/1993 | Sacripante et al. | |
| 5,226,930 A | 7/1993 | Sasaki | |
| 5,266,432 A | 11/1993 | Hayashi et al. | |
| 5,320,925 A | 6/1994 | Imai et al. | |
| 5,376,172 A | 12/1994 | Tripp et al. | |
| 5,415,936 A | 5/1995 | Deusser et al. | |
| 5,422,214 A | 6/1995 | Akiyama et al. | |
| 5,424,161 A | 6/1995 | Hayashi et al. | |
| 5,475,044 A | 12/1995 | Stein | |
| 5,480,755 A | 1/1996 | Uchiyama et al. | |
| 5,484,678 A * | 1/1996 | Pickering et al. | 430/108.3 |
| 5,531,929 A | 7/1996 | Kobayashi | |
| 5,543,173 A | 8/1996 | Horn, Jr. et al. | |

(Continued)

FOREIGN PATENT DOCUMENTS

| CN | 1688509 A | 10/2005 |
|---|---|---|
| DE | 196 16 781 A1 | 11/1997 |

(Continued)

OTHER PUBLICATIONS

Translation of JP 2004-359476 published Dec. 2004.*

(Continued)

*Primary Examiner* — Peter Vajda

(57) ABSTRACT

This invention provides metal oxide particles surface-treated with a cyclic silazane and a hydrophobicity-imparting agent, methods of making such, and toner compositions comprising the same.

63 Claims, 4 Drawing Sheets

$^{13}$C CP/MAS NMR of Colloidal Silica Treated with a Cyclic Silazane and PTMS

U.S. PATENT DOCUMENTS

| | | | |
|---|---|---|---|
| 5,597,853 A | 1/1997 | Itoh et al. |
| 5,651,921 A | 7/1997 | Kaijou |
| 5,665,156 A | 9/1997 | Ettlinger et al. |
| 5,665,511 A | 9/1997 | Imai et al. |
| 5,686,054 A | 11/1997 | Barthel et al. |
| 5,711,797 A | 1/1998 | Ettlinger et al. |
| 5,716,748 A | 2/1998 | Hasegawa et al. |
| 5,725,987 A | 3/1998 | Combes et al. |
| 5,747,211 A | 5/1998 | Hagi et al. |
| 5,766,814 A | 6/1998 | Baba et al. |
| 5,776,240 A | 7/1998 | Deller et al. |
| 5,776,646 A | 7/1998 | Hagi et al. |
| 5,824,442 A | 10/1998 | Tanikawa et al. |
| 5,824,739 A | 10/1998 | Kondo et al. |
| 5,827,632 A | 10/1998 | Inaba et al. |
| 5,840,287 A | 11/1998 | Guskey et al. |
| 5,843,525 A | 12/1998 | Shibasaki et al. |
| 5,849,451 A | 12/1998 | Ishihara et al. |
| 5,900,315 A | 5/1999 | Little |
| 5,902,635 A | 5/1999 | Garafalo et al. |
| 5,908,660 A | 6/1999 | Griffith et al. |
| 5,916,722 A * | 6/1999 | Creatura et al. ......... 430/108.23 |
| 5,919,298 A | 7/1999 | Griffith et al. |
| 5,942,590 A | 8/1999 | Burns et al. |
| 5,959,005 A | 9/1999 | Hartmann et al. |
| 5,969,023 A | 10/1999 | Enami et al. |
| 5,989,768 A * | 11/1999 | Little ....................... 430/108.24 |
| 6,004,711 A | 12/1999 | Bourne et al. |
| 6,004,714 A | 12/1999 | Ciccarelli et al. |
| 6,015,843 A | 1/2000 | Van Vlasselaer et al. |
| 6,025,455 A | 2/2000 | Yoshitake et al. |
| 6,045,650 A | 4/2000 | Mitchnick et al. |
| 6,051,672 A | 4/2000 | Burns et al. |
| 6,066,421 A | 5/2000 | Julien et al. |
| 6,077,640 A | 6/2000 | Komai et al. |
| 6,086,668 A | 7/2000 | Farneth et al. |
| 6,087,059 A | 7/2000 | Duggan et al. |
| 6,103,441 A | 8/2000 | Tomita et al. |
| 6,107,351 A | 8/2000 | Burns et al. |
| 6,165,663 A | 12/2000 | Baba et al. |
| 6,180,076 B1 | 1/2001 | Uhrlandt et al. |
| 6,183,867 B1 | 2/2001 | Barthel et al. |
| 6,184,408 B1 | 2/2001 | Burns et al. |
| 6,190,815 B1 | 2/2001 | Ciccarelli et al. |
| 6,191,122 B1 | 2/2001 | Lux et al. |
| 6,193,795 B1 | 2/2001 | Nargiello et al. |
| 6,197,384 B1 | 3/2001 | Schubert et al. |
| 6,197,470 B1 | 3/2001 | Tamura |
| 6,203,960 B1 | 3/2001 | Ciccarelli et al. |
| 6,214,507 B1 | 4/2001 | Sokol et al. |
| 6,242,147 B1 | 6/2001 | Anno et al. |
| 6,248,495 B1 | 6/2001 | Inokuchi et al. |
| 6,255,373 B1 | 7/2001 | Akamatsu et al. |
| 6,270,937 B2 | 8/2001 | Yuasa et al. |
| 6,287,739 B1 | 9/2001 | Kawakami et al. |
| 6,294,303 B1 | 9/2001 | Putnam et al. |
| 6,312,861 B1 | 11/2001 | Ciccarelli et al. |
| 6,316,155 B1 | 11/2001 | Kudo et al. |
| 6,318,124 B1 | 11/2001 | Rutherford et al. |
| 6,319,647 B1 | 11/2001 | Gutman et al. |
| 6,335,139 B1 | 1/2002 | Gambayashi et al. |
| 6,374,637 B1 | 4/2002 | Costa et al. |
| 6,376,077 B1 | 4/2002 | Hiraishi et al. |
| 6,379,856 B2 | 4/2002 | Sokol et al. |
| 6,384,125 B1 | 5/2002 | Bergstrom et al. |
| 6,403,271 B1 | 6/2002 | Suzuki et al. |
| 6,420,456 B1 | 7/2002 | Koski |
| 6,448,331 B1 | 9/2002 | Ioka et al. |
| 6,465,670 B2 | 10/2002 | Thise et al. |
| 6,479,206 B1 | 11/2002 | Suzuki et al. |
| 6,489,075 B2 | 12/2002 | Suzuki et al. |
| 6,503,677 B1 | 1/2003 | Gutman et al. |
| 6,521,290 B1 | 2/2003 | Kudo et al. |
| 6,555,282 B2 | 4/2003 | Okuno et al. |
| 6,573,018 B2 | 6/2003 | Ishibashi et al. |
| 6,579,929 B1 | 6/2003 | Cole et al. |
| 6,589,703 B2 | 7/2003 | Stelter et al. |
| 6,610,777 B1 | 8/2003 | Anderson et al. |
| 6,613,491 B2 | 9/2003 | Inoue et al. |
| 6,657,001 B1 | 12/2003 | Anderson et al. |
| 6,677,095 B2 | 1/2004 | Murota et al. |
| 6,686,110 B2 | 2/2004 | Kadota |
| 6,696,212 B2 | 2/2004 | Marsh et al. |
| 6,706,398 B1 | 3/2004 | Revis |
| 6,706,457 B2 | 3/2004 | Koumura |
| 6,736,891 B1 | 5/2004 | Bice et al. |
| 6,780,559 B2 | 8/2004 | Veregin et al. |
| 6,800,413 B2 | 10/2004 | Barthel et al. |
| 6,803,408 B2 | 10/2004 | Anderson et al. |
| 6,811,856 B2 | 11/2004 | Nun et al. |
| 6,830,811 B2 | 12/2004 | Chao |
| 6,840,992 B2 | 1/2005 | Glaum et al. |
| 6,855,759 B2 | 2/2005 | Kudo et al. |
| 6,890,657 B2 | 5/2005 | Pickering et al. |
| 6,899,948 B2 | 5/2005 | Zhang et al. |
| 6,899,951 B2 | 5/2005 | Panz et al. |
| 6,972,301 B2 | 12/2005 | Hurlburt et al. |
| 7,014,969 B2 | 3/2006 | Yachi et al. |
| 7,014,975 B2 | 3/2006 | Barthel et al. |
| 7,022,375 B2 | 4/2006 | Schachtely et al. |
| 7,081,234 B1 | 7/2006 | Qi et al. |
| 7,083,770 B2 | 8/2006 | Shibasaki et al. |
| 7,169,832 B2 | 1/2007 | Poppe et al. |
| 7,186,440 B2 | 3/2007 | Yoshitake et al. |
| 7,214,459 B2 | 5/2007 | Iizuka et al. |
| 7,238,387 B2 | 7/2007 | Ogawa et al. |
| 7,252,885 B2 | 8/2007 | Pickering et al. |
| 7,262,233 B2 | 8/2007 | Isarov et al. |
| 7,300,734 B2 | 11/2007 | McDougall et al. |
| 7,312,009 B2 | 12/2007 | Lee et al. |
| 7,316,881 B2 | 1/2008 | Rimai et al. |
| 7,341,625 B2 | 3/2008 | Amirzadeh-Asl |
| 7,422,834 B2 | 9/2008 | Akiyama et al. |
| 7,713,326 B2 | 5/2010 | Carstens et al. |
| 7,799,870 B2 | 9/2010 | Hergenrother et al. |
| 2002/0037936 A1 | 3/2002 | Michael et al. |
| 2003/0035888 A1 | 2/2003 | Eriyama et al. |
| 2003/0082090 A1 | 5/2003 | Blume et al. |
| 2004/0077768 A1 | 4/2004 | Greenwood |
| 2004/0102529 A1 | 5/2004 | Campbell et al. |
| 2004/0138343 A1 | 7/2004 | Campbell et al. |
| 2005/0011409 A1 | 1/2005 | Isobe |
| 2005/0014894 A1 | 1/2005 | Flannigan et al. |
| 2005/0026060 A1 | 2/2005 | Ogawa et al. |
| 2005/0026087 A1 | 2/2005 | Keller |
| 2005/0026089 A1 | 2/2005 | Ogawa et al. |
| 2005/0089353 A1 | 4/2005 | Pickering et al. |
| 2005/0095521 A1 | 5/2005 | Rimai et al. |
| 2005/0095522 A1 | 5/2005 | Goebel et al. |
| 2005/0113488 A1 | 5/2005 | Isarov et al. |
| 2005/0147908 A1 | 7/2005 | Yamane et al. |
| 2005/0154124 A1 | 7/2005 | Yoshitake et al. |
| 2005/0164109 A1* | 7/2005 | Iizuka et al. ............... 430/108.1 |
| 2005/0170109 A1 | 8/2005 | Chen et al. |
| 2005/0187334 A1 | 8/2005 | Blume et al. |
| 2005/0203214 A1 | 9/2005 | Amano et al. |
| 2005/0241531 A1 | 11/2005 | Meyer et al. |
| 2006/0041035 A1 | 2/2006 | Poppe et al. |
| 2006/0046178 A1* | 3/2006 | Akiyama et al. ......... 430/108.23 |
| 2006/0062941 A1 | 3/2006 | Bi et al. |
| 2006/0084746 A1 | 4/2006 | Bice et al. |
| 2006/0099129 A1 | 5/2006 | Stenzel et al. |
| 2006/0112860 A1* | 6/2006 | Yoshitake et al. ............ 106/490 |
| 2006/0115405 A1 | 6/2006 | Konya et al. |
| 2006/0121381 A1 | 6/2006 | McDougall et al. |
| 2006/0121382 A1 | 6/2006 | Choi et al. |
| 2006/0127787 A1 | 6/2006 | Lee et al. |
| 2006/0150527 A1 | 7/2006 | Ohara et al. |
| 2006/0160008 A1 | 7/2006 | Lee et al. |
| 2006/0171872 A1 | 8/2006 | Adams |
| 2006/0178451 A1 | 8/2006 | Weller |
| 2006/0188722 A1 | 8/2006 | White et al. |
| 2006/0217473 A1 | 9/2006 | Hergentother et al. |
| 2006/0225615 A1 | 10/2006 | Raman et al. |
| 2006/0281009 A1 | 12/2006 | Boyer et al. |
| 2007/0009823 A1 | 1/2007 | Skorokhod et al. |
| 2007/0048643 A1 | 3/2007 | Kmiecik-Lawrynowicz et al. |

| | | | |
|---|---|---|---|
| 2007/0148577 | A1 | 6/2007 | Ogawa et al. |
| 2008/0069753 | A1 | 3/2008 | Floess et al. |
| 2008/0070140 | A1 | 3/2008 | Fomitchev et al. |
| 2008/0070146 | A1 | 3/2008 | Fomitchev et al. |

FOREIGN PATENT DOCUMENTS

| | | | |
|---|---|---|---|
| EP | 0 371 147 B1 | | 6/1990 |
| EP | 0 694 576 A1 | | 1/1996 |
| EP | 0 704 769 A1 | | 5/1996 |
| EP | 0 982 268 A1 | | 3/2000 |
| EP | 1 559 750 A2 | | 8/2005 |
| EP | 1 580 019 A1 | | 9/2005 |
| EP | 1 559 750 A3 | | 10/2005 |
| EP | 1 591 490 A2 | | 11/2005 |
| EP | 1 657 283 A1 | | 5/2006 |
| EP | 1 696 006 A1 | | 8/2006 |
| JP | 58-216252 | A | 12/1983 |
| JP | 62-227160 | A | 10/1987 |
| JP | 02-017932 | A | 1/1990 |
| JP | 3-187913 | A | 8/1991 |
| JP | 4-106184 | A | 4/1992 |
| JP | 04-269763 | A | 9/1992 |
| JP | 6-100313 | A | 4/1994 |
| JP | 06-194863 | A | 7/1994 |
| JP | 06-242630 | A | 9/1994 |
| JP | 07-064318 | A | 3/1995 |
| JP | 7-187647 | A | 7/1995 |
| JP | 08-095285 | A | 4/1996 |
| JP | 08-119619 | A | 5/1996 |
| JP | 8-245835 | A | 9/1996 |
| JP | 10-25427 | A | 1/1998 |
| JP | 10-36705 | A | 2/1998 |
| JP | 11-246210 | A | 9/1999 |
| JP | 2000-044226 | A | 2/2000 |
| JP | 2000-258955 | A | 9/2000 |
| JP | 2001-031843 | A | 2/2001 |
| JP | 2001-097710 | A | 4/2001 |
| JP | 2002-029730 | * | 1/2002 |
| JP | 2002-029730 | A | 1/2002 |
| JP | 2002-146233 | A | 5/2002 |
| JP | 2002-244340 | A | 8/2002 |
| JP | 2002-256170 | A | 9/2002 |
| JP | 2002-275356 | A | 9/2002 |
| JP | 2002-338230 | A | 11/2002 |
| JP | 2003-137528 | A | 5/2003 |
| JP | 2003-201112 | A | 7/2003 |
| JP | 2003-238141 | A | 8/2003 |
| JP | 2004-029699 | A | 1/2004 |
| JP | 2004-168559 | A | 6/2004 |
| JP | 2004-258265 | A | 9/2004 |
| JP | 2004-359476 | * | 12/2004 |
| JP | 2005-003726 | * | 1/2005 |
| JP | 2005-215491 | A | 8/2005 |
| JP | 2006-022316 | A | 1/2006 |
| JP | 2006-053458 | A | 2/2006 |
| JP | 2006-096641 | A | 4/2006 |
| JP | 2006-169096 | A | 6/2006 |
| JP | 2006-171017 | A | 6/2006 |
| JP | 2007-034223 | A | 2/2007 |
| JP | 2007-034224 | A | 2/2007 |
| WO | WO 2004/031076 | A1 | 4/2004 |
| WO | WO 2004/035473 | A1 | 4/2004 |
| WO | WO 2005/095525 | A1 | 10/2005 |
| WO | WO 2006/045012 | * | 4/2006 |
| WO | WO 2006/045012 | A2 | 4/2006 |
| WO | WO 2006/053632 | A2 | 5/2006 |
| WO | 2006/116887 | A1 | 11/2006 |
| WO | WO 2007/013388 | A1 | 2/2007 |

OTHER PUBLICATIONS

Translation of JP 2005-003726 published Jan. 2005.*
Diamond, "The Handbook of Imaging Materials," Marcel Dekker, NY, NY 1991. pp. 173-204.*
Translation of JP 2002-029730 published Jan. 2002.*
Maciel et al., "Silicon-29 NMR study of the surface of silica gel by cross polarization and magic-angle spinning," *J. Am. Chem. Soc.*, 102 (25): 7606-7607 (Dec. 3, 1980).
Sindorf et al., "Cross-polarization/magic-angle spinning silicon-29 nuclear magnetic resonance study of silica gel using trimethylsilane bonding as a probe of surface geometry and reactivity," *J. Phys. Chem.*, 86 (26): 5208-5219 (Dec. 23, 1982).
Sindorf et al., "Solid-state NMR studies of the reactions of silica surfaces with polyfunctional chloromethylsilanes and ethoxymethylsilanes," *J. Am. Chem. Soc.*, 105 (12): 3767-3776 (Jun. 15, 1983).
Yoshida, "Silica nucleation, polymerization, and growth preparation of monodispersed sols," in *Coloidal Silica: Fundamentals and Applications* (Bergna et al., eds.), Chapter 6, 47-56 (CRC Press, an imprint of the Taylor & Francis Group, Boca Raton, Florida, 2006).
Chen et al., *Journal of Colloid and Interface Science*, 281: 339-350 (2005).
Evonik Industries, Aerosil Product Overview (Evonik Degussa GmbH, 2009).
European Patent Office, International Search Report in International Patent Application No. PCT/US2007/020007 (Mar. 6, 2008).
European Patent Office, International Search Report in International Patent Application No. PCT/US2008/008287 (Oct. 21, 2008).
European Patent Office, International Search Report in International Patent Application No. PCT/US2008/008292 (Nov. 14, 2008).
European Patent Office, International Search Report in International Patent Application No. PCT/US2008/008293 (Oct. 21, 2008).
European Patent Office, International Preliminary Report on Patentability in International Patent Application No. PCT/US2007/020007 (Mar. 17, 2009).
European Patent Office, International Preliminary Report on Patentability in International Patent Application No. PCT/US2008/008287 (Jan. 12, 2010).
European Patent Office, International Preliminary Report on Patentability in International Patent Application No. PCT/US2008/008292 (Jan. 12, 2010).
European Patent Office, International Preliminary Report on Patentability in International Patent Application No. PCT/US2008/008293 (Jan. 12, 2010).
Cabot Corporation, CAB-O-SIL TS-530 Treated Fumed Silica, (Cabot Corporation, Sep. 2008).
Cabot Corporation, CAB-O-SIL TS-720 Treated Fumed Silica, (Cabot Corporation, Sep. 2008).
Caravajal et al., "Structural Characterization of (3-Aminopropyl)triethoxysilane-Modified Silicas by Silicon-29 and Carbon-13 Nuclear Magnetic Resonance," *Analytical Chemistry*, 60(17): 1776-1786 (Sep. 1, 1988).
Degussa, Aerosil R 972 Hydrophobic Fumed Silica Product Information, (Degussa AG, May 2005).
Evonik Industries, Aerosil R 972 Pharma Hydrophobic Colloidal Anhydrous Silica, (Evonik Degussa GmbH, Feb. 2007).
Garcia et al., "Use of p-Toluenesulfonic Acid for the Controlled Grafting of Alkoxysilanes onto Silanol Containing Surfaces: Preparation of Tunable Hydrophillic, Hydrophobic, and Super-Hydrophobic Silica," *J. Am. Chem. Soc.*, 129: 5052-5060 (2007).
Iler, "Colloidal Silica," In *The Colloid Chemistry of Silica and Silicates*, Chapter V, 87-98 (Cornell University Press, London, 1955).
Zumdahl, "Colloids," in *Chemistry, 5th Edition*, (Stratton et al., eds). Chapter 11.8, 548-550 (Houghton Mifflin Company, Boston, MA, 2000).
Japanese Patent Office; Office Action in Japanese Patent Application No. 2009-528305 (Oct. 16, 2012) English Translation.
Patent Office of The People'S Republic of China, Office Action in Chinese Patent Application No. 200780034354.6 (Nov. 30, 2011).
Gomis et al., "LLE, VLE and VLLE data for the water-n-butanol-n-hexane system at atmospheric pressure," *Fluid Phase Equilibria*, 316: 135-140 (2012).
Patent Office of The People'S Republic of China, Office Action in Chinese Patent Application No. 200880105851.5 (May 3, 2012).
Ochiai, Mitsuru, "Finely Dispersed Anhydrous Silica" in *Illustrated Powder Properties, 3rd edition*, Jyun-ichiro Tsubaki (editor), NGT Corporation, Tachikawa, Tokyo, Japan (publisher), p. 549 (Jun. 30, 2004).
Nissan Chemical Industries, Ltd., "Snowtex-O" Information Leaflet (2006) [as printed from http://db.nissanchem.co.jp/db/details.php?id=111 on Nov. 1, 2011].

* cited by examiner $^{13}$C CP/MAS NMR of Colloidal Silica Treated with a Cyclic Silazane and PTMS

CYCLIC-TREATED METAL OXIDE

CROSS-REFERENCE TO RELATED APPLICATIONS

This patent application claims the benefit of U.S. Provisional Patent Application No. 60/844,828, filed Sep. 15, 2006, which is incorporated by reference.

BACKGROUND OF THE INVENTION

Hydrophobic metal oxide particles possess physical properties that are useful in a number of applications requiring a high degree of dispersibility. Some hydrophobic metal oxide particles have physical properties that are desirable for use in toner compositions.

Untreated metal oxide particles are hydrophilic due to the presence of polar groups, such as hydroxyl groups (—OH), on the surface of the untreated silica particles. By treating hydrophilic metal oxide particles, the hydrophilic nature of the particles can be reduced, thereby imparting varying degrees of hydrophobicity to the particles. Many different methods are known for treating the surface of metal oxide particles. However, the direct treatment of an aqueous dispersion of metal oxide particles is often inefficient or difficult to achieve. Thus, there remains a desire for additional treated metal oxide particles, especially those that are useful for modifying the charge of toner particles, and for additional methods of preparing such hydrophobic metal oxide particles, especially methods that can be used to prepare hydrophobic metal oxide particles directly from an aqueous dispersion of the metal oxide particles.

BRIEF SUMMARY OF THE INVENTION

The invention provides a particle composition comprising metal oxide particles surface-treated with a cyclic silazane and a hydrophobicity-imparting agent, which metal oxide particles are hydrophobic and non-aggregated. According to one aspect of the invention, the metal oxide particle has a particle size of less than about 100 nm. According to another aspect of the invention, the metal oxide particle is treated with a hydrophobicity-imparting agent selected from the group consisting of alkylsilanes and alkoxysilanes.

The invention also provides a toner composition comprising toner particles and the metal oxide particles of the invention.

The invention further provides a method of preparing hydrophobic metal oxide particles comprising (a) providing an aqueous dispersion of metal oxide particles, wherein the dispersion is acidic or basic, (b) combining the dispersion with a cyclic silazane and a hydrophobicity-imparting agent to provide a reaction mixture, and (c) drying the reaction mixture to provide hydrophobic, non-aggregated metal oxide particles. According to one aspect of the invention, the hydrophobic, non-aggregated metal oxide particles have an average particle size of less than 100 nm. According to another aspect of the invention, the dispersion of metal oxide particles of (a) is acidic. According to yet another aspect of the invention, the hydrophobicity-imparting agent is selected from the group consisting of alkylsilanes and alkoxysilanes.

BRIEF DESCRIPTION OF THE SEVERAL VIEWS OF THE DRAWING(S)

DETAILED DESCRIPTION OF THE INVENTION

Figure 1:
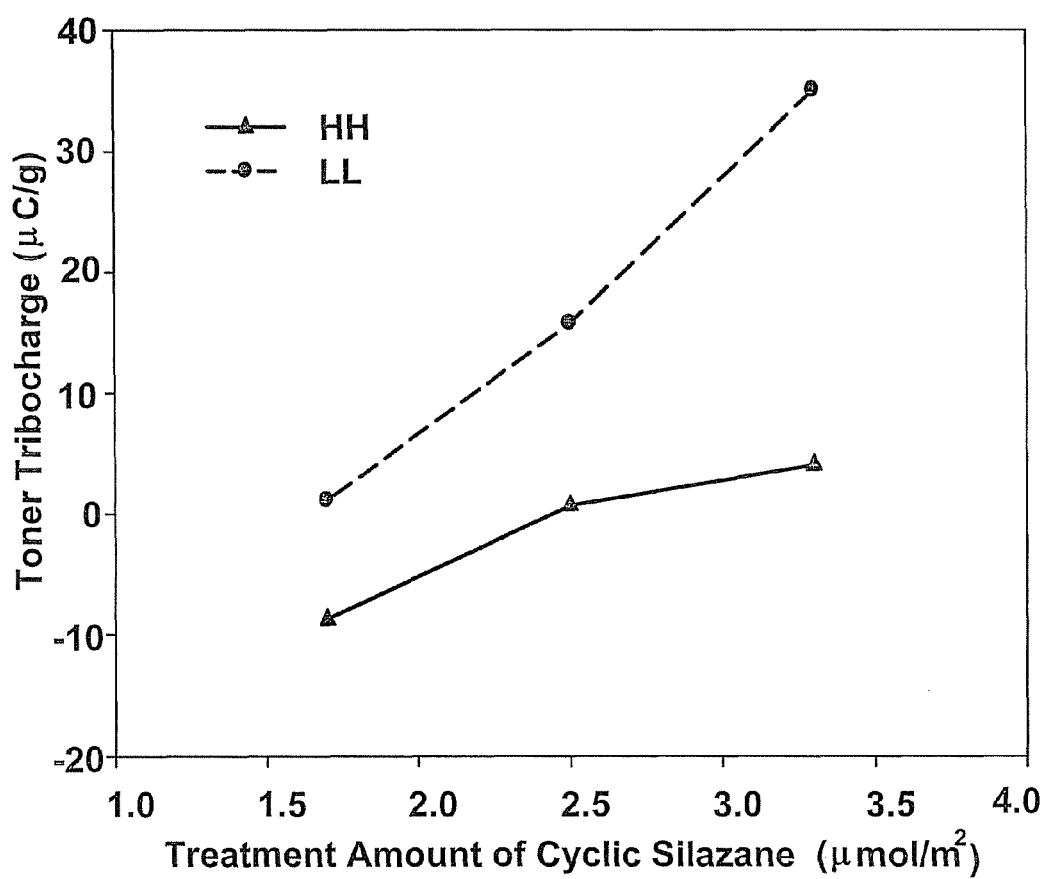
FIG. 1 is a graph of the treatment amount of cyclic silazane ($\mu$mole/m$^2$) applied to metal oxide particles treated with a cyclic silazane and hydrophobicity-imparting agent versus the tribocharge ($\mu$C/g) of a toner composition comprising the treated metal oxide particles.

The invention provides a particle composition comprising metal oxide particles surface-treated with a cyclic silazane and a hydrophobicity-imparting agent, which metal oxide particles are hydrophobic and non-aggregated.

The treated metal oxide particles can comprise any suitable type of metal oxide. For example, the metal oxide particles can comprise silica, alumina, ceria, or titania. Preferably, the metal oxide particles are colloidal metal oxide particles, such as colloidal silica particles. Colloidal metal oxide particles are non-aggregated, individually discrete particles, which typically are spherical or nearly spherical in shape, but can have other shapes (e.g., shapes with generally elliptical, square, or rectangular cross-sections). Such particles are structurally different from fumed or pyrogenically prepared particles, which are chain-like structures of aggregated primary particles.

Non-aggregated metal oxides (e.g., colloidal metal oxides), which can be treated to provide a treated metal oxide in accordance with the invention, are commercially available, or can be prepared by known methods from various starting materials (e.g., wet-process type metal oxides). Typically, the colloidal metal oxide starting material will be available as a sol, which is a dispersion of colloidal metal oxide in a suitable solvent, most often water alone or with a co-solvent and/or stabilizing agent. See, e.g., Akitoshi Yoshida, *Silica Nucleation, Polymerization, and Growth Preparation of Monodispersed Sols*, in Colloidal Silica Fundamentals and Applications 47-56 (H. E. Bergna & W. O. Roberts, eds., 2006). Non-limiting examples of commercially available colloidal silica suitable for use in the invention include SNOWTEX® products from Nissan Chemical, NexSil™ and NexSil A™ series products available from Nyacol Nanotechnologies, Inc., and Levasil® products available from H.C.Starck.

The non-aggregated metal oxide particles from which the treated metal oxide particles are prepared often comprise alkali metal cations as a result of the method by which the non-aggregated metal oxide was manufactured or stabilized in dispersion. The alkali metal cation may be present in the interior portions of the particles, as well as on the surface of the particles. "Free alkali metal cation" refers to an alkali metal cation that is solubilized in the aqueous phase of a dispersion of colloidal silica, or that is present at the surface of the metal oxide particle, and does not refer to alkali metal cations that may be bound or trapped within the interior of the metal oxide particles and, thus, inaccessible to the aqueous phase.

The treated metal oxide particles can comprise any suitable amount of free alkali metal cation. For example, the treated metal oxide particles can comprise from about 0.01 wt. % to about 0.5 wt. % free alkali metal cation (e.g., from about 0.01 wt % to about 0.2 wt. %, from about 0.03 wt. % to about 0.1 wt. %, from 0.1 wt. % to about 0.4 wt. %). Desirably, however, the metal oxide particle has substantially no free alkali metal cations, for instance, having a content of free alkali metal cation of about 0.2 wt. % or less (e.g., about 0.15 wt. % or less, about 0.1 wt. % or less, about 0.05 wt. % or less, about 0.03 wt. % or less, or about 0.01 wt. % or less). Methods by which the free alkali metal cation content of the treated metal oxide particles can be reduced are discussed herein with respect to other aspects of the invention.

The metal oxide particles are treated with a cyclic silazane and a hydrophobicity-imparting agent. The cyclic silazane can be any suitable cyclic silazane. For example, the cyclic silazane can have the formula:

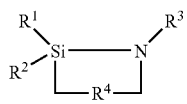

wherein $R^1$ and $R^2$ are independently selected from the group consisting of hydrogen, halogen, $C_1$-$C_4$ alkyl, $C_1$-$C_4$ alkoxy, $C_1$-$C_{10}$ aryl, and $C_1$-$C_{10}$ aryloxy; $R^3$ is selected from the group consisting of hydrogen, $(CH_2)_nCH_3$, wherein n is an integer from 0 to 3, $C(O)(CH_2)_nCH_3$, wherein n is an integer from 0 to 3, $C(O)NH_2$, $C(O)NH(CH_2)_nCH_3$, wherein n is an integer from 0 to 3, and $C(O)N[(CH_2)_nCH_3](CH_2)_mCH_3$, wherein n and m independently are integers from 0 to 3; and $R^4$ is $[(CH_2)_a(CHX)_b(CYZ)_c]$, wherein X, Y and Z are independently selected from the group consisting of hydrogen, halogen, $C_1$-$C_4$ alkyl, $C_1$-$C_4$ alkoxy, $C_1$-$C_{10}$ aryl, and $C_1$-$C_{10}$ aryloxy, and a, b, and c independently are integers from 0 to 6 satisfying the condition that (a+b+c) equals an integer from 2 to 6. Suitable cyclic silazanes, and methods of preparing cyclic silazanes, are described in U.S. Pat. No. 5,989,768. Preferably, the cyclic silazane is one according to the above formula, wherein $R^1$ and $R^2$ are methoxy groups, $R^3$ is a butyl ($CH_3CH_2CH_2CH_2$) group, and $R^4$ is $(CH_2)_a$, wherein a is an integer from 1 to 3. Another suitable cyclic silazane has the formula:

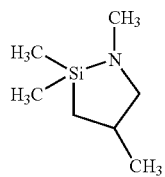

A mixture of different cyclic silazanes also can be used.

The hydrophobicity-imparting agent renders the surface of the metal oxide particles hydrophobic in whole or in part. Without wishing to be bound by any particular theory, it is believed that the hydrophobicity-imparting agent reacts with the surface hydroxyl groups on the surface of the metal oxide particles to effectively replace the hydrophilic groups with other, hydrophobic, chemical groups.

"Hydrophobic" metal oxide particles, as the term is used herein, encompass varying levels or degrees of hydrophobicity. The degree of hydrophobicity imparted to the metal oxide particles will vary depending upon the type and amount of treating agent used. Hydrophobic metal oxide particles according to the invention preferably, but not necessarily, have about 25% or more (e.g., about 35% or more, about 45% or more, or about 50% or more) of the available metal oxide surface hydroxyl groups reacted. Generally, the hydrophobic metal oxide particles according to the invention have about 85% or less (e.g., about 75% or less, or about 65% or less) of the available metal oxide surface hydroxyl groups reacted.

The hydrophobicity-imparting agent can be any suitable hydrophobicity-imparting agent, preferably capable of reacting with and/or replacing silanol groups on the surface of the metal oxide particles with hydrophobic chemical groups. Suitable hydrophobicity-imparting agents include, for example, organopolysiloxanes, organosiloxanes, organosilazanes, organosilanes, halogenorganopolysiloxanes, halogenorganosiloxanes, halogenorganosilazanes, and halogenorganosilanes.

Preferably, the hydrophobicity-imparting is hexamethyldisilazane, an alkylsilane, or an alkoxysilane compound. According to one aspect of the invention, the hydrophobicity-imparting agent is an alkylsilane or alkoxysilane. Alkoxysilanes include compounds having the general formula: $R^1_xSi(OR^2)_{4-x}$ wherein $R^1$ is selected from the group consisting of $C_1$-$C_{30}$ branched and straight chain alkyl, aminoalkyl, alkenyl, and aminoalkenyl, $C_3$-$C_{10}$ cycloalkyl, and $C_6$-$C_{10}$ aryl, $R^2$ is $C_1$-$C_{10}$ branched and straight chain alkyl, and x is an integer of 1-3. Examples of suitable alkoxysilane compounds include but are not limited to trimethylmethoxysilane, dimethyldimethoxysilane, methyltrimethoxysilane, and the like.

Preferably, the alkoxysilane compound is a trialkoxysilane compound. The trialkoxysilane compound can be any suitable trialkoxysilane. For example, the trialkoxysilane compound can have the formula: $R^1Si(OR^2)_3$, wherein $R^1$ is selected from the group consisting of $C_1$-$C_{30}$ branched and straight chain alkyl, aminoalkyl, alkenyl, and aminoalkenyl, and $C_3$-$C_{10}$ cycloalkyl, and $R^2$ is $C_1$-$C_{10}$ branched or straight chain alkyl. Preferably, the trialkoxysilane compound is selected from the group consisting of methyltrimethoxysilane, ethyltrimethoxysilane, propyltrimethoxysilane, butyltrimethoxysilane, pentyltrimethoxysilane, hexyltrimethoxysilane, heptyltrimethoxysilane, octyltrimethoxysilane, nonyltrimethoxysilane, decyltrimethoxysilane, undecyltrimethoxysilane, dodecyltrimethoxysilane, tetradecyltrimethoxysilane, stearyltrimethoxysilane, methyltriethoxysilane, ethyltriethoxysilane, propyltriethoxysilane, butyltriethoxysilane, pentyltriethoxysilane, hexyltriethoxysilane, heptyltriethoxysilane, octyltiethoxysilane, nonyltriethoxysilane, decyltriethoxysilane, undecyltriethoxysilane, dodecyltriethoxysilane, tetradecyltriethoxysilane, stearyltriethoxysilane, and combinations thereof. More preferably, the trialkoxysilane compound is selected from the group consisting of propyltrimethoxysilane, hexyltrimethoxysilane, heptyltrimethoxysilane, octyltrimethoxysilane, nonyltrimethoxysilane, decyltrimethoxysilane, undecyltrimethoxysilane, dodecyltrimethoxysilane, tetradecyltrimethoxysilane, stearyltrimethoxysilane, methyltriethoxysilane, ethyltriethoxysilane, propyltriethoxysilane, butyltriethoxysilane, pentyltriethoxysilane, hexyltriethoxysilane, heptyltriethoxysilane, octyltriethoxysilane, nonyltriethoxysilane, decyltriethoxysilane, undecyltriethoxysilane, dodecyltriethoxysilane, tetradecyltriethoxysilane, stearyltriethoxysilane, and combinations thereof. Most preferably, the trialkoxysilane compound is propyltrimethoxysilane (PTMS). A mixture of two or more hydrophobicity-imparting agents also can be used.

The treated metal oxide particles can have any suitable tap density. The tap density of the treated metal oxide particles can be determined using a tap volumeter (3000 taps) and the following equation: tap density (g/L)=(weight of the treated metal oxide particles (g))×(1000/(volume (ml) of the treated metal oxide particles)).

The tap density of the metal oxide particles typically will be about 420 g/L or less (e.g., about 400 g/L or less, about 350 g/L or less, about 300 g/L or less, about 250 g/L or less, about 200 g/L or less, or about 150 g/L or less). The tap density of the treated metal oxide particles typically will be about 75 g/L or more (e.g., about 85 g/L or more, about 95 g/L or more, about 100 g/L or more, about 125 g/L or more, or about 135 g/L or more). Accordingly, the tap density of the treated metal oxide particles is about 75 g/L to about 420 g/L (e.g., about 110 g/L to about 420 g/L, or about 200 g/L to about 300 g/L).

The treated metal oxide particles preferably have a BET surface area of about 200 $m^2/g$ or less (determined by the method of S. Brunauer, P. H. Emmet, and I. Teller, *J. Am. Chemical Society*, 60, 309 (1938), which is commonly referred to as the BET method). Typically, the treated metal oxide particles have a BET surface area of about 15 $m^2/g$ or more (e.g., about 20 $m^2/g$ or more, about 25 $m^2/g$ or more, about 30 $m^2/g$ or more, about 40 $m^2/g$ or more, about 50 $m^2/g$ or more, or about 60 $m^2/g$ or more). The BET surface area of the treated metal oxide particles typically will be about 200 $m^2/g$ or less, more typically about 180 $m^2/g$ or less (e.g., about 160 $m^2/g$ or less, about 140 $m^2/g$ or less, about 130 $m^2/g$ or less, about 120 $m^2/g$ or less, about 100 $m^2/g$ or less, about 80 $m^2/g$ or less, about 60 $m^2/g$ or less, about 50 $m^2/g$ or less, or about 40 $m^2/g$ or less). Preferably, the BET surface area of the treated metal oxide particles is about 15 $m^2/g$ to about 200 $m^2/g$, and more preferably about 20 $m^2/g$ to about 180 $m^2/g$ (e.g., about 20 $m^2/g$ to about 160 $m^2/g$, about 20 $m^2/g$ to about 140 $m^2/g$, about 20 $m^2/g$ to about 130 $m^2/g$, about 20 $m^2/g$ to about 120 $m^2/g$, or about 20 $m^2/g$ to about 100 $m^2/g$).

The treated metal oxide particles can have any suitable average non-agglomerated particle size. The particle size refers to the diameter of the smallest sphere that encloses the non-agglomerated particle. Agglomerated particles (agglomerates) are composed of several primary particles loosely attached to each other, usually by van der Waals forces. This is in contrast to aggregated particles (aggregates), in which the bonds between primary particles are stronger, as is the case when the particles sinter. As a result, de-agglomeration can be easily achieved for agglomerates. For example, dispersion of treated metal oxide particles with toner particles (dry dispersion) or in a suitable liquid (e.g., tetrahydrofuran (THF)) using high speed agitation or sonication can be used to reverse agglomeration. However, it is considerably more difficult or even impossible to reverse aggregation to any significant extent. Typically, the metal oxide particles have a non-agglomerated average particle size of about 5 nm or more (e.g., about 10 nm or more, about 15 nm or more, about 20 nm or more, or about 30 nm or more) and, generally, about 300 nm or less (e.g., about 250 nm or less, about 200 nm or less, about 150 nm or less, or about 130 nm or less). According to one aspect of the invention, the non-agglomerated average particle size of the metal oxide particles is less than about 100 nm (e.g., about 90 nm or less, about 75 nm or less, about 50 nm or less, or about 30 nm or less). Accordingly, the average particle size of the non-agglomerated metal oxide particles can be about 5 nm to about 300 nm (e.g., about 10 nm to about 100 nm, about 20 nm to about 80 nm, about 30 nm to about 70 nm, or about 40 nm to about 60 nm).

The metal oxide particles (e.g., hydrophilic particles) can have any suitable true density. Typically, the metal oxide particles have a true density of about 1.5 $g/cm^3$ or more (e.g., about 1.7 $g/cm^3$ or more, about 2.0 $g/cm^3$ or more, or about 2.2 $g/cm^3$ or more). The true density of the metal oxide particles typically will be about 5 $g/cm^3$ or less, more typically about 4 $g/cm^3$ or less (e.g., about 3.5 $g/cm^3$ or less, about 3 $g/cm^3$ or less, about 2.8 $g/cm^3$ or less, about 2.5 $g/cm^3$ or less, or about 2.3 $g/cm^3$ or less). Preferably, the true density of the metal oxide particles is about 1.5 $g/cm^3$ to about 5 $g/cm^3$, and more preferably about 1.5 $g/cm^3$ to about 4 $g/cm^3$ (e.g., about 1.5 $g/cm^3$ to about 3.5 $g/cm^3$, about 1.5 $g/cm^3$ to about 3 $g/cm^3$, about 1.8 $g/cm^3$ to about 2.8 $g/cm^3$, about 2 $g/cm^3$ to about 2.5 $g/cm^3$, or about 2.2 $g/cm^3$ to about 2.4 $g/cm^3$). More preferably, the true density of the metal oxide particles is about 1.7 $g/cm^3$ to about 2.0 $g/cm^3$, or about 2.0 $g/cm^3$ to about 2.3 $g/cm^3$.

The carbon content of the treated metal oxide particles can be used as an indicator of the level of treatment of the treated metal oxide particles and, thus, as an indicator of the degree of hydrophobicity. The carbon content of the treated particles can be determined using commercially available carbon analyzers (e.g., Leco C-200). The treated metal oxide particles prepared in accordance with the invention desirably have a carbon content of about 0.1 wt. % or more (e.g., about 0.15 wt. % or more, about 0.2 wt. % or more, about 0.25 wt. % or more, about 0.3 wt. % or more, about 0.4 wt. % or more, or about 0.5 wt. % or more). The carbon content of the treated metal oxide particles typically comprises less than about 8 wt. % (e.g., about 7 wt. % or less, about 6 wt. % or less, about 5 wt. % or less, about 4 wt. % or less, or about 3 wt. % or less). Thus, the carbon content of the treated metal oxide particles can be, for example, from about 0.1 wt. % to about 8 wt. % (e.g., from about 0.15 wt. % to about 6 wt. %, from about 0.15 wt. % to about 4 wt. %, from about 0.15 wt. % to about 2 wt. %, from about 1 wt. % to about 4 wt. %, from about 2 wt. % to about 5 wt. %, from about 3 wt. % to about 6 wt. %, or from about 4 wt. % to about 8 wt. %).

The amount of cyclic silazane that is added to the metal oxide particles can be any suitable amount. The amount of the cyclic silazane is typically less than about 6 $\mu mole/m^2$ (e.g., less than about 5.5 $\mu mole/m^2$, less than about 5 $\mu mole/m^2$, less than about 4.5 $\mu mole/m^2$, less than about 4 $\mu mole/m^2$, less than about 3.5 $\mu mole/m^2$, or less than about 3 $\mu mole/m^2$), based on the BET surface area of the metal oxide particles. The amount of the cyclic silazane generally is more than about 0.5 $\mu mole/m^2$ (e.g., more than about 1.0 $\mu mole/m^2$, more than about 1.5 $\mu mole/m^2$, more than about 2 $\mu mole/m^2$, or more than about 2.5 $\mu mole/m^2$), based on the BET surface area of the metal oxide particles. Thus, the amount of the cyclic silazane can be, for example, from about 0.5 $\mu mole/m^2$ to about 6 $\mu mole/m^2$ (e.g., from about 0.5 $\mu mole/m^2$ to about 5.5 $\mu mole/m^2$, from about 0.5 $\mu mole/m^2$ to about 5 $\mu mole/m^2$, from about 0.5 $\mu mole/m^2$ to about 4.5 $\mu mole/m^2$, from about 0.5 $\mu mole/m^2$ to about 4 $\mu mole/m^2$, from about 0.5 $\mu mole/m^2$ to about 3.5 $\mu mole/m^2$, from about 0.5 $\mu mole/m^2$ to about 3 $\mu mole/m^2$, from about 1 $\mu mole/m^2$ to about 6 $\mu mole/m^2$, from about 1.5 $\mu mole/m^2$ to about 6 $\mu mole/m^2$, from about 2 $\mu mole/m^2$ to about 6 $\mu mole/m^2$, or from about 2.5 $\mu mole/m^2$ to about 6 $\mu mole/m^2$), based on the BET surface area of the metal oxide particles.

The amount of the hydrophobicity-imparting agent that is added to the metal oxide particles can be any suitable amount. The amount of the hydrophobicity-imparting agent is typically less than about 20 $\mu mole/m^2$ (e.g., less about 18 $\mu mole/m^2$, less than about 15 $\mu mole/m^2$, less than about 12 $\mu mole/m^2$, less than about 10 $\mu mole/m^2$, less than about 8 $\mu mole/m^2$, or less than about 5 $\mu mole/m^2$), based on the BET surface area of the metal oxide particles. The amount of the hydrophobicity-imparting agent generally is more than about 0.1 mole/m$^2$ (e.g., more than about 0.25 μmole/m$^2$, more than about 0.5 μmole/m$^2$, more than about 1 μmole/m$^2$, more than about 1.5 μmole/m$^2$, more than about 2 μmole/m$^2$, more than about 2.5 μmole/m$^2$, more than about 3 μmole/m$^2$, or more than about 3.5 μmole/m$^2$), based on the BET surface area of the metal oxide particles. Thus, the amount of the hydrophobicity-imparting agent can be, for example, from about 1 μmole/m$^2$ to about 20 μmole/m$^2$ (e.g., from about 1 μmole/m$^2$ to about 18 μmole/m$^2$, from about 3 μmole/m$^2$ to about 15 μmole/m$^2$, from about 5 μmole/m$^2$ to about 12 μmole/m$^2$, from about 8 μmole/m$^2$ to about 10 μmole/m$^2$, from about 10 μmole/m$^2$ to about 18 μmole/m$^2$, from about 12 μmole/m$^2$ to about 15 μmole/m$^2$, or from about 15 μmole/m$^2$ to about 18 μmole/m$^2$), based on the BET surface area of the metal oxide particles.

The surface treatment of metal oxide particles with a cyclic silazane and a hydrophobicity-imparting agent can generate various patterns of substituted silicon atoms attached to the surface of the metal oxide particle or attached indirectly to the surface of the metal oxide particle. These substitution patterns have been referred to in the literature as M sites, D sites, T sites, and Q sites. See, for example, Sindorf, Dean William, "Silicon-29 and Carbon-13 CP/MAS NMR Studies of Silica Gel and Bonded Silane Phases," Department of Chemistry, Colorado State University, Fort Collins, Colo., 1982. The correlation of the M sites, D sites, T sites, and Q sites to the resonance signals in the CP/MAS $^{29}$Si NMR spectrum also is discussed, for example, in Maciel, G., Sindorf, D. W., *J. Am. Chem. Soc.*, 102: 7607-7608 (1980), Sindorf, D. W., Maciel, G., *J. Phys. Chem.*, 86: 5208-5219 (1982), and Sindorf, D. W., Maciel, G., *J. Am. Chem. Soc.*, 105: 3767-3776 (1983).

In accordance with one embodiment of the invention, the surface treatment of a metal oxide particle with a cyclic silazane and a hydrophobicity-imparting agent provides metal oxide particles having predominant substitution patterns referred to as T2, T3, and M sites. As used herein, T2 sites correspond to a silicon atom originating from the hydrophobicity-imparting agent having two bonds to oxygen atoms further bonded to silicon atoms, at least one of which is on the metal oxide particle surface, one bond to an oxygen atom comprising a silanol (Si—OH) group, and one bond to a carbon atom. T2 sites are represented by formula (I): R—Si(OH)—(OSi—P$^1$)(OSiP$^2$), wherein R is as defined herein for the hydrophobicity-imparting agent, and P$^1$ and P$^2$ independently represent a bond to a silicon atom on a particle surface and/or a silicon atom of another silane-containing molecule. Si atoms corresponding to T2 sites have been correlated with the resonance signals with chemical shifts in the range from −56.5 ppm to −58.5 ppm in the CP/MAS $^{29}$Si NMR spectrum, wherein the chemical shift in ppm is measured relative to the standard tetramethylsilane.

As used herein, T3 sites correspond to a silicon atom originating from the hydrophobicity-imparting agent having three bonds to an oxygen atom further bonded to silicon atoms. At least one of the silicon atoms is a silicon atom on a particle. The sites are represented by the formula (II): R—Si(OSi—P$^1$)(OSi—P$^2$)(OSi—P$^3$), wherein R is as herein defined for the hydrophobicity-imparting agent, and wherein P$^1$, P$^2$, and P$^3$ independently represent a bond to a silicon atom on a particle surface and/or a silicon atom of another silane-containing molecule. Si atoms corresponding to T3 sites have been correlated with the resonance signals with chemical shifts in the range from −66.0 ppm to −68.0 ppm in the CP/MAS $^{29}$Si NMR spectrum, wherein the chemical shift in ppm is measured relative to the standard tetramethylsilane.

As used herein, M sites correspond to a silicon atom originating from a silazane compound having three bonds to a carbon atom and one bond to an oxygen atom further bonded to a silicon atom which in turn is bonded to a surface functional group of a silica particle, upon reaction with the surface of the silica particle. M sites are represented by formula (III): R$^1$R$^2$R$^3$—Si—OP wherein R$^1$, R$^2$, and R$^3$ are C$_1$-C$_{10}$ groups bonded to the silicon atoms in the silazane compound and P is a Si atom. Si atoms corresponding to M sites have been correlated with the resonance signals with chemical shifts in the range from +7 ppm to +18 ppm in the CP/MAS $^{29}$Si NMR spectrum, wherein the chemical shift in ppm is measured relative to the standard tetramethylsilane.

The treated metal oxide particles of the invention preferably have substitution parameters resulting in CP/MAS $^{29}$Si NMR peak intensities for T2, T3, and M that satisfy the formula: (T2+T3)/M≦0.005, wherein T2 is the integrated intensity of a peak having a chemical shift in the CP/MAS $^{29}$Si NMR spectrum centered within the range of −56 ppm to −59 ppm, T3 is the integrated intensity of a peak having a chemical shift in the CP/MAS $^{29}$Si NMR spectrum centered within the range of −65 ppm to −69 ppm, and M is the intensity of a peak having a chemical shift in the CP/MAS $^{29}$Si NMR spectrum centered within the range of +7 ppm to +18 ppm. The intensity of a peak refers to the maximum peak height of the signal at that approximate location or the area of the peak occurring within the recited ranges, as calculated using standard calculation methods well known to those skilled in the art.

According to another aspect of the invention, the treated metal oxide particles of the invention preferably have substitution parameters resulting in CP/MAS $^{29}$Si NMR peak intensities for T2, T3, and M that satisfy the formula: T3/T2≧2, wherein T2 and T3 represent intensities of peaks as defined above.

The particle composition can be formulated as a dry particle composition (e.g., a dry powder) or as a dispersion comprising the treated metal oxide particles. The dispersion can comprise any suitable dispersant, preferably water alone or with a co-solvent, treating agents, or additives of any type commonly used in dispersions of treated metal oxide particles.

The treated metal oxide particles can be used for many different applications including but not limited to toner compositions, antiblocking agents, adhesion modifiers, polymer additives (e.g., for elastomers and rubbers, such as silicone rubbers), abrasion-resistant coatings and films, delustering coatings and films, reological control agents (e.g., for epoxies or liquid polymers), and mechanical/optical control agents (e.g., for composites and plastics). The treated metal oxide particles are especially useful in toner compositions. In that regard, the invention provides a toner composition comprising toner particles and metal oxide particles surface-treated with a cyclic silazane and a hydrophobicity-imparting agent, which metal oxide particles are hydrophobic and non-aggregated. All other aspects of the treated metal oxide particles are as described herein with respect to the particle composition of the invention.

Toner compositions containing the treated metal oxide particles can be formulated and developed by any suitable method. For example, toner compositions can be formulated by mixing a suitable amount of the treated particles (e.g., about 1-8 wt. % of the treated particles based on the total weight of the toner) in a blender with pulverized toner particles (e.g., styrene acrylate), preferably free of any external additives and having a suitable average diameter (e.g., about 9 μm). Toner compositions containing the treated particles then can be developed, for example, by rolling in glass jars (e.g., rolling for 30 minutes at a 2/98 wt. % toner/carrier ratio). The carrier can be, for example, 70 μm Cu—Zn ferrite coated with silicone resin.

The treated metal oxide particles of the present invention can be used in any suitable toner composition, including positively-charged or negatively-charged toner compositions. Without wishing to be bound by a particular theory, it is thought that the presence of the treated metal oxide particles stabilizes and increases the absolute tribocharge value of toner compositions containing the metal oxide particles.

The tribocharge of toner compositions containing the treated metal oxide particles can be either positive or negative. Tribocharge measurements can be made using suitable techniques and equipment known in the art (e.g., Vertex T-150 tribocharger). Measurements can be made after conditioning the toner particles overnight in a standard humidity chamber at 30° C. and 80% relative humidity (HH) and at 18° C. and 15% relative humidity (LL). The toner particles (e.g., of a toner composition comprising about 4 wt. % treated metal oxide particles) preferably have a tribocharge at HH conditions of about $-10$ μC/g to about $+15$ μC/g (e.g., about $-10$ μC/g to about μC/g, about $-5°$ C./g to about $+10$ μC/g, about $0$ μC/g to about $+5$ μC/g, or about $+5$ μC/g to about $+10$ μC/g). The toner particles preferably have a tribocharge at LL conditions of about $0$ μC/g to about $+45$ μC/g (e.g., about $+5$ μC/g to about $+35$ μC/g, or about $+10$ μC/g to about $+25$ μC/g).

In a preferred aspect of the invention, the treated metal oxide particles can be used to improve the free-flow characteristics of a toner composition. Without wishing to be bound by a particular theory, it is thought that the presence of the treated metal oxide particles, especially particles which have been jet milled, improves the free-flow of toner compositions containing the metal oxide particles due to the lower tap and pour densities of the treated particles. In the context of the invention, free-flow is the percentage of toner discharged from a grounded metal role tube of 25 mm in diameter and 350 nm in length, with seven 0.5 mm discharge holes, that contains 40 g of the toner composition and is rotated at 30 rpm for one minute for a total of 30 rotations.

The toner composition comprising the treated metal oxide particles preferably has a free-flow of about 1 wt. % loss or more (e.g., about 1.5 wt. % loss or more, about 2 wt. % loss or more, about 2.5 wt. % loss or more, about 3 wt. % loss or more, or about 3.5 wt. % loss or more). The free-flow of the toner composition typically will be about 10 wt. % loss or less (e.g., about 8 wt. % loss or less, about 7 wt. % loss or less, about 6 wt. % loss or less, about 5 wt. % loss or less, or about 4 wt. % loss or less). Preferably, the free-flow of the toner composition is about 1 wt. % loss to about 10 wt. % loss (e.g., about 1 wt. % loss to about 8 wt. % loss, about 1 wt. % loss to about 7 wt. % loss, about 1 wt. % loss to about 6 wt. % loss, about 1 wt. % loss to about 5 wt. % loss, about 1 wt. % loss to about 4 wt. % loss, about 1.5 wt. % loss to about 8 wt. % loss, about 2 wt. % loss to about 8 wt. % loss, about 2.5 wt. % loss to about 8 wt. % loss, about 3 wt. % loss to about 8 wt. % loss, or about 3.5 wt. % loss to about 8 wt. % loss).

Also provided is a method of preparing hydrophobic, non-aggregated metal oxide particles, which method comprises (a) providing an aqueous dispersion of metal oxide particles, wherein the reaction mixture is acidic or basic, (b) combining the dispersion with a cyclic silazane and a hydrophobicity-imparting agent to provide a reaction mixture, and (c) drying the reaction mixture to provide hydrophobic, non-aggregated metal oxide particles. The cyclic silazane and hydrophobicity imparting agent are as described herein with respect to the metal oxide particles of the invention.

The aqueous dispersion of metal oxide particles preferably is colloidally stable. The colloidal stability of the dispersion prevents any substantial portion of the particles from irreversibly agglomerating or gelling, or from settling out of the dispersion during use. The aqueous dispersion of metal oxide particles used in conjunction with the invention preferably has a degree of colloidal stability such that the average overall particle size of the metal oxide in dispersion, as measured by dynamic light scattering, does not change over a period of 1 hour or more (e.g., about 8 hours or more, or about 24 hours or more), more preferably 2 weeks or more (e.g., about 4 weeks or more, or about 6 weeks or more), most preferably 8 weeks or more (e.g., about 10 weeks or more, or about 12 weeks or more), or even about even 16 weeks or more.

The aqueous dispersion of metal oxide particles can be acidic or basic prior to combining the aqueous dispersion of metal oxide particles with the cyclic silazane and hydrophobicity-imparting agent. The dispersion can have any acidic or basic pH. An acidic aqueous dispersion of metal oxide is typically characterized by a pH of about 2 to less than about 7. A basic aqueous dispersion is typically characterized by a pH of greater than about 7 to about 12. The pH of the dispersion can be adjusted to desired levels, for example, by adding an acid or a base to the dispersion. According to one aspect of the invention, the dispersion is acidic.

The aqueous dispersion of metal oxide particles can be provided by a commercially available dispersion of metal oxide particles (e.g., a commercially available colloidal metal oxide), several examples of which are disclosed above in connection with the particle composition of the invention. Alternatively, the aqueous dispersion of metal oxide particles can be prepared by any suitable method. For example, an aqueous dispersion of metal oxide particles can be prepared by dispersing metal oxide particles in water, alone or with a co-solvent, using a high-shear mixer. Alternatively, the aqueous dispersion of metal oxide particles can be prepared in solution from a metal oxide precursor. For example, an aqueous dispersion of silica particles can be prepared by adjusting the pH of an alkali silicate solution to about 9 to about 11, wherein the silicate anions provided by the alkali silicate undergo polymerization to produce discrete silica particles having the desired average particle size in the form of an aqueous dispersion. Specific protocols and techniques for preparing aqueous dispersions of metal oxides in this manner and controlling the particle size of such dispersions (e.g., by adjusting temperature, concentration, and pH) are generally available in the art. Furthermore, other suitable methods of providing an aqueous dispersion of metal oxide particles are known in the art, any of which can be used in conjunction with the invention. Preferably, the aqueous dispersion of metal oxide particles is an aqueous dispersion of colloidal metal oxide particles, especially colloidal silica particles.

Whether provided by a commercially available product, or provided in some other manner, the aqueous dispersion of metal oxide particles may contain alkali metal cations as a result of the manufacture or stabilization of the dispersion. The alkali metal cation can be sodium, potassium, or any other Group I metal cation. According to a preferred aspect of the invention, the free alkali metal cation content of the metal oxide dispersion can be reduced, for example, by treatment of the dispersion with an acidic ion exchange resin. Alternatively, or in addition, the free alkali metal cation content of the base-stabilized dispersion can be reduced by using ultrafiltration, e.g., difiltration. Reduction of the free alkali metal cation content also may reduce the pH of the dispersion. If desired, the pH can be adjusted without increasing the alkali metal content by addition of an amine or ammonium hydroxide (NH$_4$OH). In this respect, it is also possible to avoid the need to reduce the alkali metal cation content of the dispersion, in accordance with this preferred aspect of the invention, by using an ammonium-stabilized aqueous dispersion of metal oxide as a starting material.

Reduction of the free alkali metal cation content of the aqueous dispersion of metal oxide, to the extent it is required, can be performed at any time before or after the cyclic silazane and/or hydrophobicity-imparting agent is added to the aqueous dispersion of metal oxide. For example, the free alkali metal cation reducing treatment (e.g, ion exchange, ultrafiltration, or the like) can be performed as part of the production process of the metal oxide dispersion, or can be performed on a commercially available aqueous dispersion of metal oxide before use in the invention (e.g., about 1 hour or less before use, or about 1 day or less before use, or about 1 week or less before use). Alternatively, such treatment can be employed after one or both of the cyclic silazane and hydrophobicity-imparting agent is combined with the dispersion of metal oxide particles. Instead, or in addition, free alkali metal cation reducing treatment also can be used to reduce the alkali metal content of the treated metal oxide particles at a later time, for example, by dispersing dried, treated metal oxide particles in water or an acceptable solvent and reducing the alkali metal content of the dispersion, after which the treated metal oxide particles can be isolated and/or dried by any suitable method.

When the dispersion is combined with the cyclic silazane and hydrophobicity-imparting agent, desirably the dispersion need not be combined with an organic solvent. More specifically, the treatment of the metal oxide particles with the cyclic silazane and hydrophobicity-imparting agent in water is effective without an organic solvent. For example, when the hydrophobicity-imparting agent contains 6 carbon atoms or less, the hydrophobicity-imparting agent is sufficiently soluble in water to effect treatment of the metal oxide particles without the addition of organic solvent.

Alternatively, when the dispersion is combined with the cyclic silazane and hydrophobicity-imparting agent, the dispersion can be combined with an organic solvent. The organic solvent can be any suitable organic solvent. Preferably, the organic solvent is water-soluble or water-miscible. More preferably, the organic solvent is water-soluble. The water-soluble organic solvent can be any suitable water-soluble organic solvent, such as an alcohol (e.g., methanol, ethanol, n-propanol, 2-propanol, n-butanol, isobutanol, sec-butanol, tert-butanol, n-propanol, ethylene glycol, and propylene glycol), ketone (e.g., acetone and 2-butanone), ether (e.g., tetrahydrofuran and 1,2-dimethoxyethane), and combinations thereof. The water and water-soluble organic solvent can be added in any order. For example, the water can be added before the water-soluble organic solvent, or vice versa. Desirably, the water is added first, to reduce the concentration of solids to a suitable amount before addition of the water-soluble organic solvent, especially when using a base-stabilized dispersion. Although not wishing to be bound by a particular theory, it is thought that adding the water before the water-soluble organic solvent prevents the dispersion from gelling. Typically, the reaction mixture will comprise no more than about 50 wt. % of organic solvent, and preferably will comprise not more than about 40 wt. % of organic solvent.

When the dispersion is combined with a water-soluble organic solvent, the water-soluble organic solvent to water volume ratio can be any suitable ratio. The ratio typically is less than about 10 (e.g., about 8 or less, about 6 or less, about 5 or less, about 3 or less, about 2 or less, or about 1 or less). The ratio can be about 0.05 or more (e.g., about 0.1 or more, about 0.5 or more). Thus, the ratio can be from about 0.05 to about 10 (e.g., from about 0.1 to about 5, or from about 0.2 to about 2). Preferably, the ratio is about 1 or less (e.g., 0.7 or less).

The aqueous dispersion containing the metal oxide particles can contain any suitable amount of metal oxide particles. The aqueous dispersion typically comprises about 45 wt. % or less (e.g., about 35 wt. % or less, about 25 wt. % or less, about 15 wt. % or less, about 10 wt. % or less, or about 5 wt. % or less) metal oxide particles. The aqueous dispersion can comprise about 5 wt. % or more (e.g., about 10 wt. % or more, about 15 wt. % or more, about 20 wt. % or more, about 25 wt. % or more, or about 30 wt. % or more) metal oxide particles. Thus, the aqueous dispersion can comprise, for example, from about 5 wt. % to about 45 wt. % (e.g., from about 10 wt. % to about 45 wt. %, or from about 15 wt. % to about 35 wt. %) metal oxide particles.

Before treatment, the aqueous dispersion of metal oxide particles can be acidic, i.e., pH less than about 7, or basic, i.e., pH greater than about 7. The pH of the dispersion can be, for example, less than about 12 (e.g., about 11 or less, about 10 or less, about 9 or less, about 8 or less, or about 7 or less). Generally, the pH of the reaction mixture will be about 1 or more (e.g., about 2 or more, about 3 or more, about 4 or more, about 5 or more, or about 6 or more). Thus, the pH of the reaction mixture can be, for example, from about 1 to about 12 (e.g., from about 1 to about 5, from about 1 to about 3.5, from about 1 to about 2.5, from about 7 to about 12, from about 8 to about 11, from about 9 to about 10.5, or from about 9.5 to about 10.5).

The reaction mixture can be maintained at any temperature for any period of time that allows the cyclic silazane and the hydrophobicity-imparting agent to react completely, or to any extent desired, with the aqueous dispersion of the metal oxide particles (e.g., react with the silanol groups on the surface of the silica particles). Generally, the reaction mixture is maintained at a temperature of about 20° C. to about 100° C. (e.g., about 20° C. to about 80° C., about 30° C. to about 55° C., about 55° C. to about 70° C.) for about 5 minutes or longer (e.g., about 10 minutes or longer, or about 30 minutes or longer), or even about 60 minutes or longer (e.g., about 120 minutes or longer, about 180 minutes or longer, or about 240 minutes or longer). Longer reaction times (e.g., about 5 hours or longer, about 7 hours or longer, about 10 hours or longer, or about 20 hours or longer) may be required depending upon particular reaction conditions (e.g., temperature and concentration of reagents).

The reaction mixture can be contained in an open or closed reactor. While the reaction mixture can be maintained in an atmosphere of air, oxygen can be excluded from the reaction atmosphere, in which event the reaction mixture can be maintained under an atmosphere consisting essentially of nitrogen, argon, or a mixture thereof.

The cyclic silazane and the hydrophobicity-imparting agent can be combined with the aqueous dispersion in any suitable manner. The aqueous dispersion of metal oxide particles can be combined with the cyclic silazane to provide a first reaction mixture, and the first reaction mixture can be maintained at any temperature and for a sufficient time to allow the cyclic silazane to react with the aqueous dispersion of metal oxide particles as described herein. Generally, the first reaction mixture is maintained at a temperature of about 20° C. to about 70° C. (e.g., about 30° C. to about 55° C., or about 40° C. to about 55° C.) for up to about 1 hour (e.g., about 5 minutes, about 20 minutes, about 30 minutes, or about 45 minutes). Upon addition of the cyclic silazane, the pH of the first reaction mixture will typically be greater than about 7 (e.g., about 7.5 or more, or about 8 or more). More preferably, the pH of the first reaction mixture is from about 9 to about 11.

The hydrophobicity-imparting agent can then be added to the first reaction mixture to provide a second reaction mixture, and the second reaction mixture can then be maintained at a temperature, and for a sufficient time, to allow the hydrophobicity-imparting agent to react with the surface hydroxyl groups on the metal oxide particles. Generally, the second reaction mixture is maintained at a temperature of about 20° C. to about 70° C. (e.g., about 30° C. to about 55° C., or about 40° C. to about 55° C.) for about 1 hour to about 7 hours (e.g., about 2 hours to about 6 hours, or about 3 hours to about 5 hours).

Alternatively, the aqueous dispersion is combined with the hydrophobicity-imparting agent to provide a first reaction mixture prior to adding the cyclic silazane. The pH of the first reaction mixture will be acidic or basic depending on the pH of the starting dispersion and the particular hydrophobicity-imparting agent used. Generally, the first reaction mixture is maintained at a temperature of about 45° C. to about 55° C. (e.g., about 45° C. to 50° C., or about 50° C. to 55° C.) for about 3 hours or longer (e.g., about 4 hours or longer, about 5 hours or longer, or about 6 hours or longer).

According to this embodiment, the cyclic silazane is subsequently added to the first reaction mixture to provide a second reaction mixture. Upon addition of the cyclic silazane, the pH of the second reaction mixture typically will be greater than about 7 (e.g., about 7.5 or more, or about 8 or more). More preferably, the pH of the second reaction mixture is about 9 to about 11. Generally, the second reaction mixture is maintained at a temperature of about 20° C. to about 70° C. (e.g., about 20° C. to about 25° C., or about 25° C. to about 30° C.) for about 1 hour or longer (e.g., about 1.5 hours or longer, about 2 hours or longer, about 3 hours or longer, or about 4 hours or longer). Desirably, the reaction can be carried out at room temperature (e.g., from about 20° C. to about 30° C.).

In yet another alternative, the cyclic silazane and hydrophobicity-imparting agent are combined with the aqueous dispersion simultaneously, or substantially simultaneously, to provide a reaction mixture. For example, the components can be combined simultaneously, or stepwise, to a reaction vessel containing the aqueous dispersion of metal oxide particles so that not more than 5 minutes (e.g., not more than 10 minutes, or not more than 30 minutes) elapses between addition of the two components. Upon addition of the cyclic silazane, the pH of the reaction mixture typically will be greater than about 7 (e.g., about 8 or more, or about 9 or more). Generally, the reaction mixture is maintained at a temperature of about 20° C. to about 80° C. (e.g., about 30° C. to about 55° C., or about 40° C. to about 55° C.) for about 1 hour to about 8 hours (e.g., about 2 hours to about 7 hours, about 3 hours to about 6 hours, or about 4 hours to about 5 hours).

After treatment with the cyclic silazane and hydrophobicity-imparting agent, the metal oxide particles preferably are isolated from the reaction mixture and dried. The treated metal oxide particles can be dried after isolation from the reaction mixture, or directly from the reaction mixture, by evaporating the volatile components of the reaction mixture from the treated metal oxide particles. Evaporation of the volatile components of the reaction mixture can be accomplished using any suitable techniques, e.g., heat and/or reduced atmospheric pressure. When heat is used, the treated metal oxide particles can be heated to any suitable drying temperature, for example, by using an oven or other similar device, or by spray drying.

Spray drying involves spraying the reaction mixture, or some portion thereof, comprising the hydrophobic metal oxide particles as a fine mist into a drying chamber, wherein the fine mist is contacted with hot air causing the evaporation of volatile components of the reaction mixture.

The drying temperature chosen will depend, at least in part, on the specific components of the reaction mixture that require evaporation. Typically, the drying temperature will be about 40° C. or higher (e.g., about 50° C. or higher) such as about 70° C. or higher (e.g., about 80° C. or higher) or even about 120° C. or higher (e.g., about 130° C. or higher). Thus, the drying temperatures fall generally within the range of about 40° C. to about 250° C. (e.g., about 50° C. to about 200° C.), such as about 60° C. to about 200° C. (e.g., about 70° C. to about 175° C.), or about 80° C. to about 150° C. (e.g., about 90° C. to about 130° C.).

The hydrophobic, non-aggregated metal oxide particles can be dried at any pressure that will provide a useful rate of evaporation. When drying temperatures of about 120° C. and higher (e.g., about 120° C. to about 150° C.) are used, drying pressures of about 125 kPa or less (e.g., about 75 kPa to about 125 kPa) are suitable. At drying temperatures lower than about 120° C. (e.g., about 40° C. to about 120° C.), drying pressures of about 100 kPa or less (e.g., about 75 kPa or less) are useful. Of course, reduced pressure (e.g., pressures of about 100 kPa or less, 75 kPa or less, or even 50 kPa or less) can be used as a sole method for evaporating the volatile components of the reaction mixture.

Alternatively, the hydrophobic, non-aggregated metal oxide particles can be dried by lyophilization, wherein the liquid components of the reaction mixture are converted to a solid phase (i.e., frozen) and then to a gas phase by the application of a vacuum. For example, the reaction mixture comprising the hydrophobic, non-aggregated metal oxide particles can be brought to a suitable temperature (e.g., about −20° C. or less, or about −10° C. or less, or even −5° C. or less) to freeze the liquid components of the reaction mixture, and a vacuum can be applied to evaporate those components of the reaction mixture to provide dry hydrophobic, non-aggregated metal oxide particles.

The hydrophobic, non-aggregated metal oxide particles can be washed prior to or after isolation and/or drying from the reaction mixture. Washing the hydrophobic, non-aggregated metal oxide particles can be performed using a suitable washing solvent, such as water, a water-miscible organic solvent, a water-immiscible solvent, or a mixture thereof. The washing solvent can be added to the reaction mixture and the resulting mixture suitably mixed, followed by filtration, centrifugation, or drying to isolate the washed hydrophobic metal oxide particles. Alternatively, the hydrophobic, non-aggregated metal oxide particles can be isolated from the reaction mixture prior to washing. The washed hydrophobic, non-aggregated metal oxide particles can be further washed with additional washing steps followed by additional filtration, centrifugation, and/or drying steps.

The hydrophobic, non-aggregated metal oxide particles have a particle size that is dependent, at least in part, on the particle size of the metal oxide particles in the initial dispersion. Preferred average particle sizes of the hydrophobic, non-aggregated metal oxide particles prepared according to the method of the invention are as described with respect to the particle composition of the invention. Desirably, the average particle size of the hydrophobic, non-aggregated particle prepared in accordance with the method of the invention is within about 50%, preferably within about 30% (e.g., within about 20%, about 15%, about 10%, or even about 5%) of the average particle size of the metal oxide particle of the starting dispersion.

Preferably, the particle size of the hydrophobic metal oxide particles is further reduced after drying. Suitable processes for the reduction of the particle size of the hydrophobic metal oxide particles include but are not limited to wet or dry grinding, hammer milling, and jet milling.

All other aspects of the inventive method of preparing a hydrophobic, non-aggregated metal oxide particle and resulting product are as discussed herein with respect to the particle composition of the invention.

The following examples further illustrate the invention but, of course, should not be construed as in any way limiting its scope.

EXAMPLES

In each of the following examples, hydrophobic, non-aggregated metal oxide particles were prepared by treating an aqueous dispersion of commercially available colloidal silica particles with a cyclic silazane and a hydrophobicity-imparting agent. The examples employ hexamethyldisilazane (HMDZ) or propyltrimethoxysilane (PTMS) as hydrophobicity-imparting agents, as specified. The cyclic silazane referenced in the examples was a compound of the following formula:

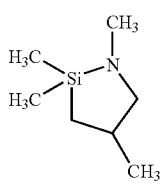

The commercially available colloidal silica particles used in the examples are summarized in Table 1. Unless otherwise specified, treatment of the colloidal silica particles was carried out in an appropriately sized 3-neck round-bottom flask equipped with an overhead stirring motor, thermocouple, and condenser.

TABLE 1

| Dispersion | Wt. % Silica in Dispersion | pH | Surface Area After Drying ($m^2/g$) | Particle Size (nm) |
|---|---|---|---|---|
| Nissan MP 1040 | 40 | 9.6 | 25 | 101 |
| SNOWTEX YL | 40 | 9.6 | 34 | 83 |
| SNOWTEX OYL | 20 | 2 | 34 | 70 |
| SNOWTEX XL | 40 | 9.6 | 45 | 52 |
| SNOWTEX OL-20 | 20 | 2 | 60 | 45 |
| SNOWTEX OL-40 | 40 | 2 | 60 | 45 |

*OYL and OL are ion-exchanged aqueous dispersions of colloidal silica.

The toner compositions referenced in the following examples were prepared by mixing 4 wt. % of the treated silica particles in a laboratory blender with a pulverized styrene acrylate black toner (9 μm average diameter) free of any external additives, followed by rolling for 30 minutes at a 2/98 wt. % toner/carrier ratio in glass jars. The carrier was 70 μm Cu—Zn ferrite coated with silicone resin. Samples were conditioned in a standard humidity chamber at either a high humidity and high temperature (30° C. and 80% relative humidity) ("HH") or at a low humidity and low temperature (18° C. and 15% relative humidity) ("LL") overnight. Tribocharge measurements were taken using a Vertex T-150 tribocharger.

Example 1

This example demonstrates the correlation between the amount of cyclic silazane absorbed on the surface of the treated metal oxide particles and the tribocharge of toner compositions comprising the treated metal oxide particles.

Three colloidal silica compositions (Compositions 1A-1C) were prepared as follows: 166 mL of deionized water was added to 100 g of SNOWTEX OL-40 colloidal silica dispersion, reducing the concentration of silica to approximately 15 wt. %. Cyclic silazane was added to the dispersion in the amount indicated in Table 2, with constant stirring, and was allowed to react with the colloidal silica dispersion under rigorous stirring conditions at room temperature for approximately 2 hours. PTMS was then added to the mixture in the amount indicated in Table 2, and allowed to react for approximately 3 hours. The dispersions were dried in an oven at approximately 120° C. and the resultant white solid product was ground using a food processor. The carbon content of the resulting treated particles is presented in Table 2.

Toner compositions were prepared using the treated particles in the manner previously described. The tribocharge values of the resulting toner compositions are presented in Table 2. The tribocharge values were plotted against the amount of cyclic silazane used to treat the metal oxide particles, as shown in FIG. 1.

TABLE 2

| Composition | Cyclic Silazane (μmole/$m^2$) | PTMS (μmole/$m^2$) | Carbon Content (wt. %) | Tribocharge (HH) (μC/g) | Tribocharge (LL) (μC/g) |
|---|---|---|---|---|---|
| 1A | 1.7 | 4.8 | 1.5 | −8.8 | +1.1 |
| 1B | 2.5 | 4.8 | 1.9 | +0.7 | +15.7 |
| 1C | 3.3 | 4.8 | 1.8 | +4.1 | +35.1 |

The results show that the tribocharge of the toner increases with increasing amounts of the cyclic silazane used to treat the metal oxide particles (compare, for example, Composition 1A with Composition 1B). These results demonstrate that the tribocharge of the toner can be controlled by the amount of cyclic silazane used to treat the metal oxide particles.

Example 2

This example demonstrates the effect of treating metal oxide particles with both a cyclic silazane and a hydrophobicity-imparting agent on the tribocharge and free-flow properties of toner compositions comprising the treated metal oxide particles.

Two colloidal silica compositions (Compositions 2A-2B) were prepared as follows: deionized water was added to 100 g of SNOWTEX YL colloidal silica dispersion in an amount sufficient to reduce the concentration of colloidal silica to approximately 20 wt. %. Cyclic silazane was added to the dispersion in the amount indicated in Table 3, with continuous stirring, and allowed to react under rigorous stirring conditions at room temperature for approximately 2 hours. PTMS was then added to the mixture in the amount indicated in Table 3, and allowed to react at room temperature for approximately 3 hours. The dispersions were dried in an oven at approximately 130° C., and the resultant white solid product was ground using a food processor. The carbon content of the resulting particles is presented in Table 3, and $^1$H MAS NMR spectra of the particles are presented in FIG. 2.

Toner compositions were prepared using the treated particles in the manner previously described. The tribocharge values of the toner compositions is provided in Table 3.

TABLE 3

| Composition | Cyclic Silazane (μmole/m$^2$) | PTMS (μmole/m$^2$) | Carbon Content (wt. %) | Tribocharge (HH) (μC/g) | Tribocharge (LL) (μC/g) | Free-flow (wt. %) |
|---|---|---|---|---|---|---|
| 2A | 2.66 | — | 0.85 | −9 | −13 | 1.33 |
| 2B | 2.66 | 6.4 | 1.49 | −2 | +11 | 2.4 |

Figure 2:
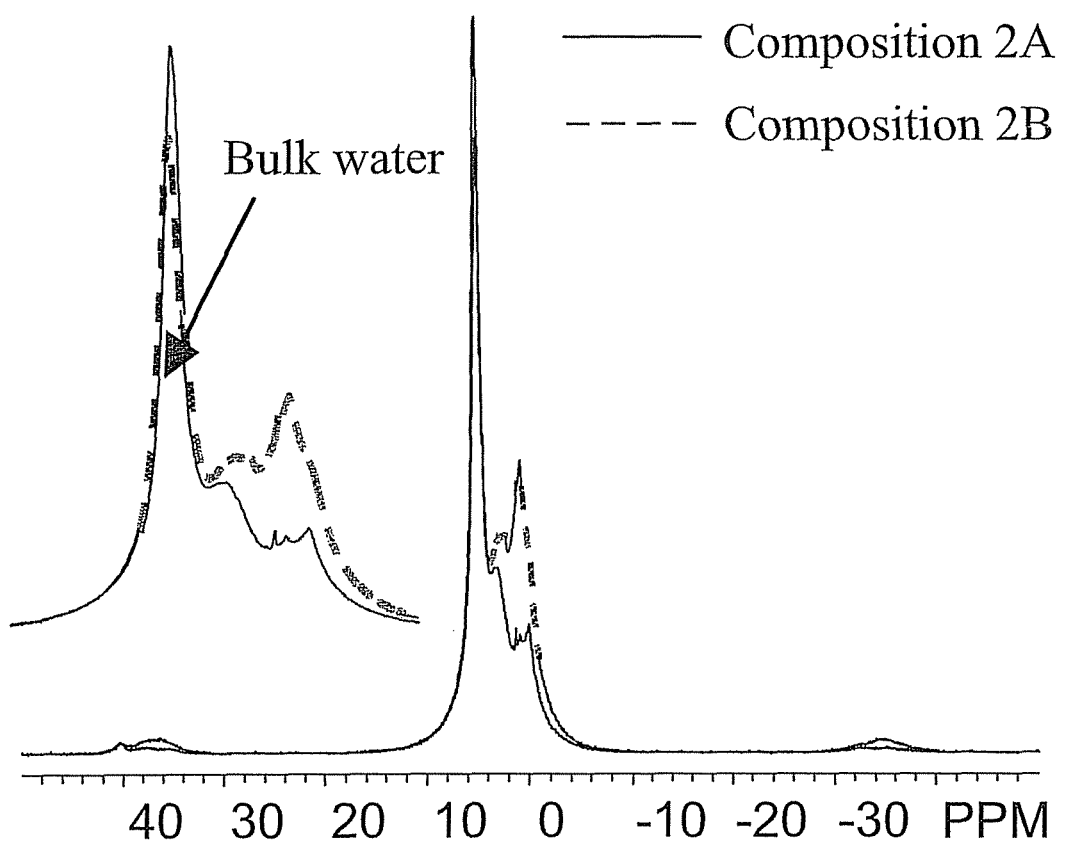
FIG. 2 is a $^1$H MAS NMR spectra of metal oxide particles treated with a cyclic silazane alone, and metal oxide particles treated with a cyclic silazane and a hydrophobicity-imparting agent.

In FIG. 2, the peak at approximately 5 ppm, which is magnified in the left corner of the figure, represents the amount of bulk water present in the particle compositions. Comparison of the peaks of Compositions 2A and 2B illustrates that particles treated with both a cyclic silazane and a hydrophobicity-imparting agent (Composition 2B) contain significantly less bulk water than particles treated only with a cyclic silazane (Composition 2A).

A comparison of the tribocharge and free-flow characteristics of the toner compositions prepared using the treated particle compositions shows that metal oxide particles treated with both a cyclic silazane and a hydrophobicity-imparting agent (Composition 2B) increases the positive tribocharge and free-flow characteristics of toner particles to a greater degree as compared to metal oxide particles treated only with a cyclic silazane (Composition 2A).

These results demonstrate that the bulk water content of treated particles, and the tribocharge and free-flow characteristics of toner compositions prepared using the treated particles, can be controlled by the type of treatment employed.

Example 3

This example demonstrates the effect of treating metal oxide particles with a cyclic silazane and hydrophobicity-imparting agent on the tribocharge of toner compositions comprising the treated metal oxide particles.

Three treated silica particle compositions (Compositions 3A-3C) were prepared as follows: deionized water was added to the silica dispersion indicated in Table 4 in an amount amount indicated in Table 4, and the mixture was allowed to react at room temperature under rigorous stirring conditions for approximately 1 hour. PTMS (6.4 μmole/m$^2$) was then added to the mixture and allowed to react at room temperature for approximately 2 hours. The dispersions were dried in an sufficient to reduce the concentration of silica to about 15 wt. %. Cyclic silazane was added to the dispersion in the oven at approximately 120° C. and the resultant white solid was ground using a food processor.

The carbon content of the dried particles before and after extraction with an organic solvent are presented in Table 4. Extraction was a Soxhlet extraction using 0.5-2 g of silica and approximately 100 ml toluene. $^{13}$C CP/MAS NMR spectra of the treated particle compositions are presented in FIG. 3. Each treated silica composition was used to prepare a toner composition in the manner previously described. The tribocharge values of the toner compositions are presented in Table 4.

TABLE 4

| Composition | Silica | Cyclic Silazane (μmole/m$^2$) | Carbon Content (wt. %) | Carbon Content After Extraction (wt. %) | Tribocharge (HH) (μC/g) | Tribocharge (LL) (μC/g) |
|---|---|---|---|---|---|---|
| 3A | SNOWTEX YL | 1.5 | 1.03 | — | −12 | −30 |
| 3B | SNOWTEX YL | 2.9 | 1.4 | 1.4 | −8 | +1 |
| 3C | SNOWTEX OYL | 4.4 | 1.9 | 1.8 | +1 | +12 |

Figure 3:
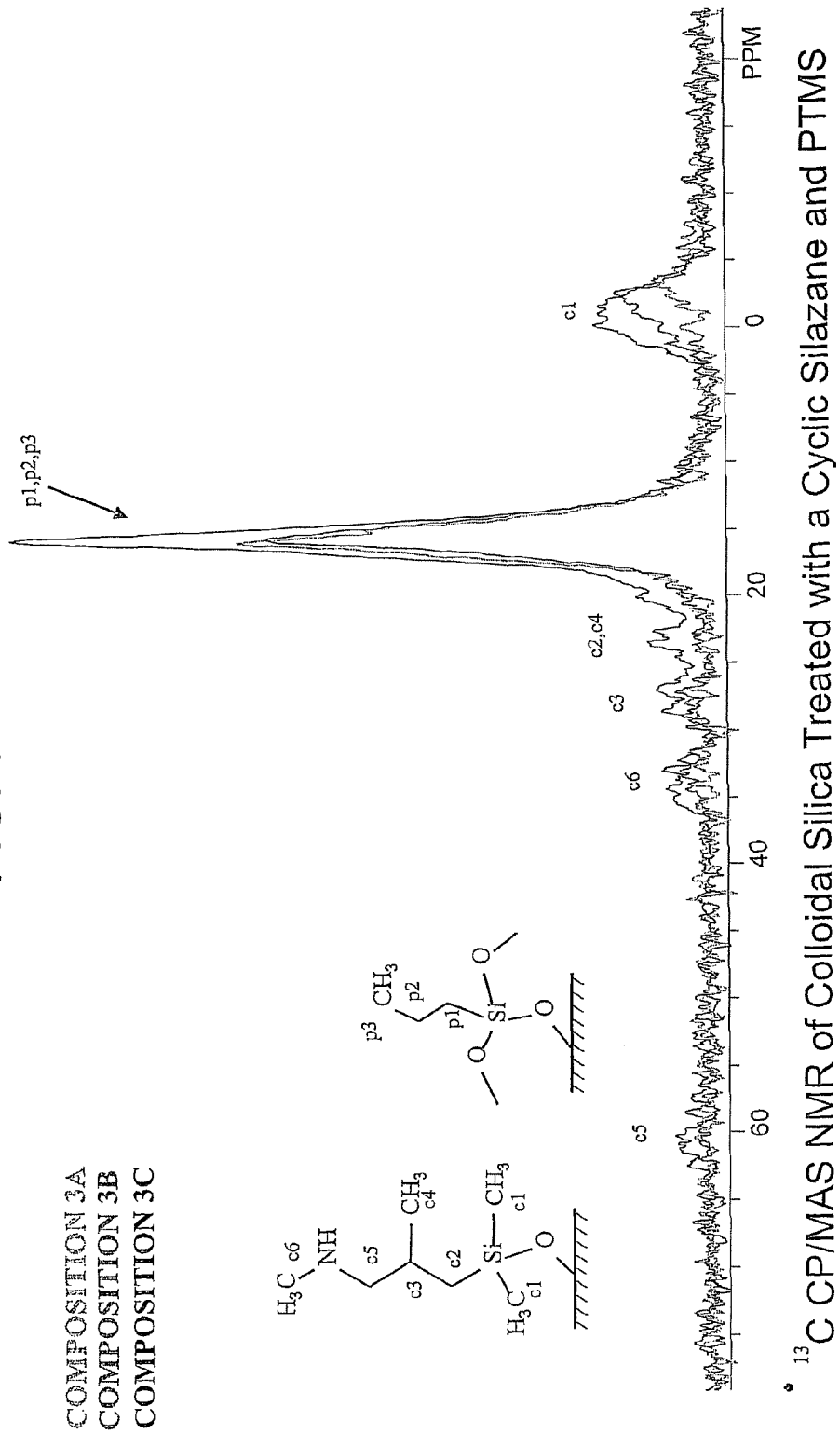
FIG. 3 is a $^{13}$C CP/MAS NMR spectra of metal oxide particles treated with a cyclic silazane and a hydrophobicity-imparting agent.

FIG. 3 illustrates that the treatment level of the particles increases with increasing amounts of cyclic silazane. Furthermore, comparison of the tribocharge values of the toner compositions shows that the absolute value of the tribocharge increases with increasing amounts of cyclic silazane used to treat the metal oxide particles.

Example 4

This example demonstrates the effect of the surface area of the treated metal oxide particles on the tribocharge and free-flow properties of toner compositions comprising the treated metal oxide particles.

Five colloidal silica compositions (Compositions 4A-4E) were prepared as follows: deionized water was added to a dispersion of colloidal silica as indicated in Table 5 in an amount sufficient to reduce the concentration of colloidal silica to approximately 18-20 wt. %. Cyclic silazane in the amount indicated in Table 5 was added to the mixture, and allowed to react under rigorous stirring conditions at room temperature for approximately 1-3 hours. HMDZ was then added in the amount indicated in Table 5 and allowed to react at 50° C. for approximately 3-5 hours. The dispersions were dried in an oven at approximately 120° C., and the resultant white solid product was ground using a food processor. The carbon content and surface area of the treated particles are presented in Table 6.

Figure 4:
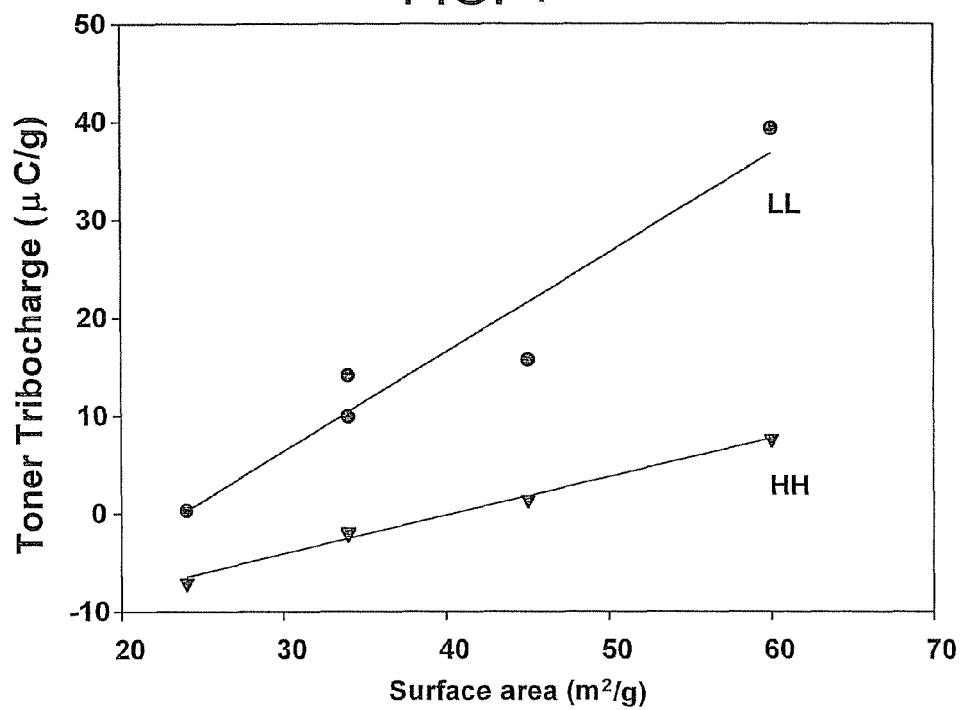
FIG. 4 is a graph of the calculated surface area (m$^2$/g) of metal oxide particles treated with cyclic silazane and a hydrophobicity-imparting agent versus the tribocharge of a toner composition comprising the treated metal oxide particles.

Toner compositions were prepared using the treated particles in the manner previously described. The tribocharge and free-flow values of the toner compositions are presented in Table 6. The surface area of the treated particles was plotted against the tribocharge of the toner composition containing the particles, as presented in FIG. 4.

TABLE 5

| Composition | Silica | Silica Amount (g) | Cyclic Silazane (µmole/m$^2$) | HMDZ (µmole/m$^2$) |
|---|---|---|---|---|
| 4A | SNOWTEX OL-40 | 400 | 3.3 | 11 |
| 4B | SNOWTEX XL | 400 | 4.4 | 15 |
| 4C | SNOWTEX OYL | 800 | 4.4 | 15 |
| 4D | SNOWTEX YL | 400 | 4.4 | 15 |
| 4E | MP-1040 | 400 | 6.0 | 20 |

TABLE 6

| Composition | Surface Area (m$^2$/g) | Carbon Content (wt. %) | Tribocharge (HH) (µC/g) | Tribocharge (LL) (µC/g) | Free-flow (wt. %) |
|---|---|---|---|---|---|
| 4A | 60 | 1.6 | 7.6 | 39.3 | 2.0 |
| 4B | 45 | 2.3 | 1.4 | 15.7 | 2.0 |
| 4C | 34 | 1.0 | −2.1 | 14.1 | 2.9 |
| 4D | 34 | 1.0 | −1.9 | 9.9 | 2.6 |
| 4E | 25 | 0.7 | −7.1 | 0.3 | 1.4 |

The results show that tribocharge increases with increasing surface area and resultant increases in the carbon content (treatment level) of the treated metal oxide particles.

Example 5

This example demonstrates the effect of the surface area of the treated metal oxide particles on the tribocharge and free-flow properties of toner compositions comprising the treated metal oxide particles.

Three colloidal silica compositions (Compositions 5A-5C) were prepared as follows: deionized water was added to a dispersion of colloidal silica as indicated in Table 7 in an amount sufficient to reduce the concentration of colloidal silica to approximately 18-20 wt. %. Cyclic silazane in the amount indicated in Table 7 was added to the mixture, and allowed to react under rigorous stirring conditions at room temperature for approximately 2-3 hours. PTMS was then added in the amount indicated in Table 7 and allowed to react at room temperature for approximately 2-3 hours. The dispersions were dried in an oven at approximately 120° C., and the resultant white solid product was ground using a food processor. The carbon content and surface area of the treated particles are presented in Table 8.

Figure 5:
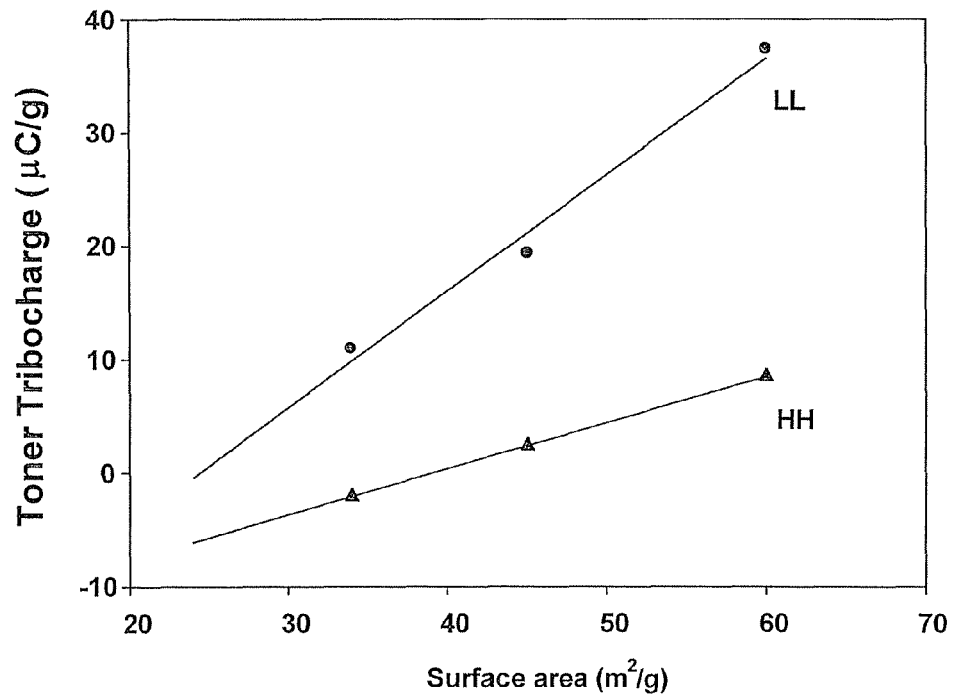
FIG. 5 is a graph of the calculated surface area (m$^2$/g) of metal oxide particles treated with cyclic silazane and a hydrophobicity-imparting agent versus the tribocharge of a toner composition comprising the treated metal oxide particles.

Toner compositions were prepared using the treated particles in the manner previously described. The tribocharge and free-flow values of the toner compositions are presented in Table 8. The surface area of the treated particles was plotted against the tribocharge of the toner composition containing the particles, as presented in FIG. 5.

TABLE 7

| Composition | Silica | Silica Amount (g) | Cyclic Silazane (µmole/m$^2$) | PTMS (µmole/m$^2$) |
|---|---|---|---|---|
| 5A | SNOWTEX OL-40 | 400 | 3.3 | 4.8 |
| 5B | SNOWTEX XL | 400 | 4.4 | 6.4 |
| 5C | SNOWTEX OYL | 400 | 2.66 | 6.4 |

TABLE 8

| Composition | Surface Area (m$^2$/g) | Carbon Content (wt. %) | Tribocharge (HH) (µC/g) | Tribocharge (LL) (µC/g) | Free-flow (wt. %) |
|---|---|---|---|---|---|
| 5A | 60 | 2.1 | 8 | 37 | 1.9 |
| 5B | 45 | 2.1 | 2 | 19 | 2.0 |
| 5C | 34 | 1.5 | −2 | 11 | 2.9 |

The results show that tribocharge increases with increasing surface area and resultant increases in the carbon content (treatment level) of the treated metal oxide particles.

Example 6

This example demonstrates the preparation of hydrophobic metal oxide particles by treating colloidal silica particles with a cyclic silazane and a hydrophobicity-imparting agent.

A reaction vessel was charged with 39 kg of SNOWTEX XL colloidal silica dispersion. While continually agitating the dispersion with a stirrer and recirculating through a homogenizer, 52 kg of deionized water was added to the dispersion to reduce the concentration of colloidal silica to approximately 17 wt. %. 0.48 kg of cyclic silazane was then added to the dispersion, with continued agitation. The reaction mixture was kept at room temperature and allowed to react for 3 hours, after which time 2.1 kg hexamethyldisilazane (HMDZ) was added to the mixture with continuous agitating and recirculation. The temperature of the mixture was increased to 58° C. for 6 hours.

Heat input to the reactor was stopped after 6 hours, but stirring and recirculation continued for an additional 12 hours. The slurry was spray dried the following day at a temperature of approximately 122° C. (dryer exit temperature). The inlet temperature to the dryer was 235° C. The powder was collected from both the cyclone collector and the bag filter. After drying, the powder was jet milled.

The resulting particle composition had a carbon content of 1.42 wt. % prior to extraction. After extraction with toluene, the particle composition had a carbon content of 1.23 wt. %. Extraction was performed by a Soxhlet extraction technique using 0.5-2 g of silica and approximately 100 ml toluene. The tap density of the particles was determined to be 267 g/L (0 taps), 347 g/L (300 taps), 376 g/L (600 taps), 397 g/L (1250 taps), 417 g/L (3000 taps). A toner composition was prepared using the particle composition in the manner previously described. The resulting toner composition had a tribocharge (HH) of −2 µC/g, a tribocharge (LL) of +9 µC/g, and a free-flow of 2.01 wt. % loss.

Example 7

This example demonstrates the preparation of hydrophobic metal oxide particles by treating colloidal silica particles with a cyclic silazane and a hydrophobicity-imparting agent.

A reaction vessel was charged with 59 kg of SNOWTEX OL colloidal silica dispersion. While continually agitating the dispersion with a stirrer and recirculating through a homogenizer, 7 kg of deionized water was added to the dispersion to reduce the concentration of colloidal silica to approximately 19 wt. %. 0.42 kg of cyclic silazane was then added to the dispersion, with continued agitation. The reaction mixture was kept at room temperature and allowed to react for 0.3 hours, after which time 2.1 kg hexamethyldisilazane (HMDZ) was added to the mixture while it was continuously agitated and recirculated. The temperature was increased to 58° C. for 5 hours.

The heat input to the reactor was stopped after 6 hours, but stirring and recirculation continued for an additional 16 hours. The slurry was spray dried the following day at a temperature of approximately 125° C. (dryer exit temperature). The inlet temperature to the dryer was 235° C. The powder was collected from both the cyclone collector and the bag filter. After drying, the powder was jet milled.

The resulting particle composition had a carbon content of 1.38 wt. %. After extraction with toluene, the particle composition had a carbon content of 1.17 wt. %. Extraction was performed by Soxhlet extraction technique using 0.5-2 g of silica and approximately 100 ml toluene. Tap density of the particles was determined to be 241 g/L (0 taps), 328 g/L (300 taps), 350 g/L (600 taps) 373 g/L (1250 taps), 385 g/L (3000 taps). A toner composition was prepared using the particle composition in the manner previously described. The resulting toner composition had a tribocharge (HH) of +3 µC/g, a tribocharge (LL) of +31 µC/g, and a free-flow of 6.83 wt. % loss.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A particle composition comprising silica particles surface-treated with a cyclic silazane and a hydrophobicity-imparting agent, which silica particles are hydrophobic, non-aggregated, and have an average particle size of about 100 nm or less, wherein the hydrophobicity-imparting agent is selected from alkoxysilanes.

2. A particle composition comprising silica particles surface-treated with a cyclic silazane and a hydrophobicity-imparting agent, which silica particles are hydrophobic and non-aggregated, and wherein the hydrophobicity-imparting agent is selected from alkoxysilanes.

3. The composition of claim 1, wherein the cyclic silazane is represented by the following formula:

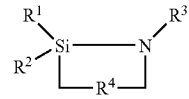

wherein $R^1$ and $R^2$ are independently selected from the group consisting of hydrogen, halogen, $C_1$-$C_4$ alkyl, $C_1$-$C_4$ alkoxy, $C_1$-$C_{10}$ aryl, and $C_1$-$C_{10}$ aryloxy; $R^3$ is selected from the group consisting of hydrogen, $(CH_2)_nCH_3$, wherein n is an integer from 0 to 3, $C(O)(CH_2)_nCH_3$, wherein n is an integer from 0 to 3, $C(O)NH_2$, $C(O)NH(CH_2)_nCH_3$, wherein n is an integer from 0 to 3, and $C(O)N[(CH_2)_nCH_3](CH_2)_mCH_3$, wherein n and m independently are integers from 0 to 3; and $R^4$ is $[(CH_2)_a(CHX)_b(CYZ)_c]$, wherein X, Y and Z are independently selected from the group consisting of hydrogen, halogen, $C_1$-$C_4$ alkyl, $C_1$-$C_4$ alkoxy, $C_1$-$C_{10}$ aryl, and $C_1$-$C_{10}$ aryloxy, and a, b, and c independently are integers from 0 to 6 satisfying the condition that (a+b+c) equals an integer from 2 to 6.

4. The composition of claim 3, wherein $R^1$ and $R^2$ are methoxy groups, $R^3$ is a butyl ($CH_3CH_2CH_2CH_2$) group, and $R^4$ is $(CH_2)_a$, wherein a is an integer from 1 to 3.

5. The composition of claim 1, wherein the cyclic silazane is represented by the following formula:

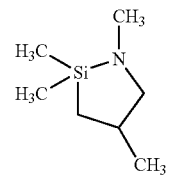

6. The composition of claim 1, wherein the hydrophobicity-imparting agent is a trialkoxysilane compound.

7. The composition of claim 6, wherein the trialkoxysilane compound is propyltrimethoxysilane.

8. The composition of claim 1, wherein the silica particles have a BET surface area of about 200 m²/g or less.

9. The composition of claim 8, wherein the silica particles have a BET surface area of about 40 m²/g or less.

10. The composition of claim 1, wherein the silica particles have a true density of about 1.7 g/cm³ to about 2.0 g/cm³.

11. The composition of claim 1, wherein the silica particles have a true density of about 2.0 g/cm³ to about 2.3 g/cm³.

12. The composition of claim 1, wherein the silica particles have a tap density of about 110 g/L to about 420 g/L.

13. The composition of claim 1, wherein the silica particles have a carbon content of about 0.1 wt. % to about 8 wt. %.

14. The composition of claim 1, wherein the silica particles are treated with about 0.5 to about 6 μmole/m², based on the BET surface area of the silica particles, of the cyclic silazane.

15. The composition of claim 1, wherein the silica particles are treated with about 1 to about 20 μmole/m², based on the BET surface area of the silica particles, of the hydrophobicity-imparting agent.

16. A particle composition comprising metal oxide particles surface-treated with a cyclic silazane and a hydrophobicity-imparting agent, which metal oxide particles are hydrophobic, non-aggregated, and have an average particle size of about 100 nm or less, wherein
the hydrophobicity-imparting agent is selected from alkoxysilanes, and
a solid-state Si nuclear magnetic resonance spectrum of the metal oxide particles exhibits a ratio (T2+T3)/M of about 0.005 or less, wherein M is the integrated intensity of a peak having a chemical shift in the CP/MAS²⁹Si NMR spectrum centered within the range of +7 ppm to +18 ppm, wherein T2 is the integrated intensity of a peak having a chemical shift in the CP/MAS²⁹Si NMR spectrum centered within the range of −56 ppm to −59 ppm, and wherein T3 is the integrated intensity of a peak having a chemical shift in the CP/MAS²⁹Si NMR spectrum centered within the range of −65 ppm to −69 ppm.

17. A particle composition comprising metal oxide particles surface-treated with a cyclic silazane and a hydrophobicity-imparting agent, which metal oxide particles are hydrophobic, non-aggregated, and have an average particle size of about 100 nm or less, wherein
the hydrophobicity-imparting agent is selected from alkoxysilanes, and
a solid-state Si nuclear magnetic resonance spectrum of the metal oxide particles exhibits a ratio T3/T2 of about 2 to about 10, wherein T2 is the integrated intensity of a peak having a chemical shift in the CP/MAS²⁹Si NMR spectrum centered within the range of −56 ppm to −59 ppm, and wherein T3 is the integrated intensity of a peak having a chemical shift in the CP/MAS²⁹Si NMR spectrum centered within the range of −65 ppm to −69 ppm.

18. The composition of claim 1, wherein the silica particles are colloidal silica particles.

19. A toner composition comprising toner particles and silica particles surface-treated with a cyclic silazane and a hydrophobicity-imparting agent, which silica particles are hydrophobic, non-aggregated, and have an average particle size of about 100 nm or less, wherein the hydrophobicity-imparting agent is selected from alkoxysilanes.

20. A toner composition comprising toner particles and silica particles surface-treated with a cyclic silazane and a hydrophobicity-imparting agent, which silica particles are hydrophobic and non-aggregated, wherein
the toner composition is a positively-charged toner composition, and
the hydrophobicity-imparting agent is selected from alkoxysilanes.

21. A toner composition comprising toner particles and silica particles surface-treated with a cyclic silazane and a hydrophobicity-imparting agent, which silica particles are hydrophobic and non-aggregated, and wherein the hydrophobicity-imparting agent is selected from alkoxysilanes.

22. The toner composition of claim 19, wherein the cyclic silazane is represented by the following formula:

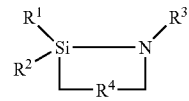

wherein $R^1$ and $R^2$ are independently selected from the group consisting of hydrogen, halogen, $C_1$-$C_4$ alkyl, $C_1$-$C_4$ alkoxy, $C_1$-$C_{10}$ aryl, and $C_1$-$C_{10}$ aryloxy; $R^3$ is selected from the group consisting of hydrogen, $(CH_2)_n CH_3$, wherein n is an integer from 0 to 3, $C(O)(CH_2)_n CH_3$, wherein n is an integer from 0 to 3, $C(O)NH_2$, $C(O)NH(CH_2)_n CH_3$, wherein n is an integer from 0 to 3, and $C(O)N[(CH_2)_n CH_3](CH_2)_m CH_3$, wherein n and m independently are integers from 0 to 3; and $R^4$ is $[(CH_2)_a(CHX)_b(CYZ)_c]$, wherein X, Y and Z are independently selected from the group consisting of hydrogen, halogen, $C_1$-$C_4$ alkyl, $C_1$-$C_4$ alkoxy, $C_1$-$C_{10}$ aryl, and $C_1$-$C_{10}$ aryloxy, and a, b, and c independently are integers from 0 to 6 satisfying the condition that (a+b+c) equals an integer from 2 to 6.

23. The toner composition of claim 22, wherein $R^1$ and $R^2$ are methoxy groups, $R^3$ is a butyl ($CH_3CH_2CH_2CH_2$) group, and $R^4$ is $(CH_2)_a$, wherein a is an integer from 1 to 3.

24. The toner composition of claim 19, wherein the cyclic silazane is represented by the following formula:

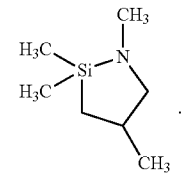

25. The toner composition of claim 19, wherein the hydrophobicity-imparting agent is propyltrimethoxysilane.

26. The toner composition of claim 19, wherein the silica particles have a BET surface area of about 200 m²/g or less.

27. The toner composition of claim 26, wherein the silica particles have a BET surface area of about 40 m²/g or less.

28. The toner composition of claim 19, wherein the silica particles have a true density of about 1.7 g/cm³ to about 2.0 g/cm³.

29. The toner composition of claim 19, wherein the silica particles have a true density of about 2.0 g/cm³ to about 2.3 g/cm³.

30. The toner composition of claim 19, wherein a plurality of the silica particles has a tap density of about 75 g/L to about 420 g/L.

31. The toner composition of claim 19, wherein the silica particles have a carbon content of about 0.1 wt. % to about 8 wt. %.

32. The toner composition of claim 19, wherein the toner has a tribocharge in a standard humidity chamber at a high humidity and high temperature (30° C. and 80% relative humidity) of about −10 μC/g to about +15 μC/g, and at a low humidity and low temperature (18° C. and 15% relative humidity) of about 0 μC/g to about +45 μC/g.

33. The toner composition of claim 19, wherein the silica particles are combined with about 0.5 to about 6 μmole/m², based on the BET surface area of the silica, of the cyclic silazane.

34. The toner composition of claim 19, wherein the silica particles are combined with about 1 to about 20 µmole/m², based on the BET surface area of the silica, of the hydrophobicity-imparting agent.

35. The toner composition of claim 19, wherein the toner has a free-flow of about 1 wt. % loss to about 10 wt. % loss.

36. A toner composition comprising toner particles and metal oxide particles surface-treated with a cyclic silazane and a hydrophobicity-imparting agent, which metal oxide particles are hydrophobic, non-aggregated, and have an average particle size of about 100 nm or less, wherein
the hydrophobicity-imparting agent is selected from alkoxysilanes, and
a solid-state Si nuclear magnetic resonance spectrum of the metal oxide particles exhibits a ratio (T2+T3)/M of about 0.005 or less, wherein M is the intensity of a peak having a chemical shift in the CP/MAS²⁹Si NMR spectrum centered within the range of +7 ppm to +18 ppm, wherein T2 is the intensity of a peak having a chemical shift in the CP/MAS²⁹Si NMR spectrum centered within the range of −56 ppm to −59 ppm, and wherein T3 is the intensity of a peak having a chemical shift in the CP/MAS²⁹Si NMR spectrum centered within the range of −65 ppm to −69 ppm.

37. A toner composition comprising toner particles and metal oxide particles surface-treated with a cyclic silazane and a hydrophobicity-imparting agent, which metal oxide particles are hydrophobic, non-aggregated, and have an average particle size of about 100 nm or less, wherein
the hydrophobicity-imparting agent is selected from alkoxysilanes, and
a solid-state Si nuclear magnetic resonance spectrum of the metal oxide particles exhibits a ratio T3/T2 of about 2 to about 10, wherein T2 is the intensity of a peak having a chemical shift in the CP/MAS²⁹Si NMR spectrum centered within the range of −56 ppm to −59 ppm, and wherein T3 is the intensity of a peak having a chemical shift in the CP/MAS²⁹Si NMR spectrum centered within the range of −65 ppm to −69 ppm.

38. The toner composition of claim 19, wherein the silica particles are colloidal silica particles.

39. A method of preparing hydrophobic, non-aggregated silica particles comprising:
(a) providing an aqueous dispersion of silica particles, wherein the aqueous dispersion is acidic or basic,
(b) combining the dispersion with a cyclic silazane and a hydrophobicity-imparting agent to provide a reaction mixture, wherein the hydrophobicity-imparting agent is selected from alkoxysilanes, and
(c) drying the reaction mixture to provide hydrophobic, non-aggregated silica particles having a particle size of about 100 nm or less.

40. A method of preparing hydrophobic, non-aggregated silica particles comprising:
(a) providing an aqueous dispersion of silica particles, wherein the aqueous dispersion is acidic,
(b) combining the dispersion with a cyclic silazane and a hydrophobicity-imparting agent to provide a reaction mixture, wherein the hydrophobicity-imparting agent is selected from alkoxysilanes, and
(c) drying the reaction mixture to provide hydrophobic, non-aggregated silica particles.

41. A method of preparing hydrophobic, non-aggregated silica particles comprising:
(a) providing an aqueous dispersion of silica particles, wherein the aqueous dispersion is acidic or basic,
(b) combining the dispersion with a cyclic silazane and a hydrophobicity-imparting agent to provide a reaction mixture, wherein the hydrophobicity-imparting agent is selected from alkoxysilanes, and
(c) drying the reaction mixture to provide hydrophobic, non-aggregated silica particles.

42. The method of claim 39, wherein step (b) further comprises:
(b1) combining the dispersion with a cyclic silazane to provide a first reaction mixture, wherein the first reaction mixture is maintained at a temperature of about 20° C. to about 70° C. for up to about 1 hour;
(b2) adding a hydrophobicity-imparting agent to the first reaction mixture to provide a second reaction mixture, wherein the second reaction mixture is maintained at a temperature of about 20° C. to about 70° C. for about 1 hour to about 7 hours.

43. The method of claim 39, wherein the cyclic silazane and hydrophobicity-imparting agent of step (b) are substantially simultaneously combined with the dispersion to provide a reaction mixture, and wherein the reaction mixture is maintained at a temperature of about 20° C. to about 70° C. for about 1 hour to about 8 hours.

44. The method of claim 39, wherein step (b) further comprises:
(b1) combining the dispersion with a hydrophobicity-imparting agent to provide a first reaction mixture, wherein the first reaction mixture is maintained at a temperature of about 45° C. to about 55° C. for about 3 hours or longer;
(b2) adding a cyclic silazane to the first reaction mixture to provide a second reaction mixture, wherein the second reaction mixture is maintained at a temperature of about 20° C. to about 30° C. for about 1 hour or longer.

45. The method of claim 39, wherein the cyclic silazane is represented by the following formula:

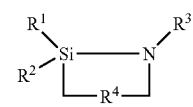

wherein $R^1$ and $R^2$ are independently selected from the group consisting of hydrogen, halogen, $C_1$-$C_4$ alkyl, $C_1$-$C_4$ alkoxy, $C_1$-$C_{10}$ aryl, and $C_1$-$C_{10}$ aryloxy; $R^3$ is selected from the group consisting of hydrogen, $(CH_2)_nCH_3$, wherein n is an integer from 0 to 3, $C(O)(CH_2)_nCH_3$, wherein n is an integer from 0 to 3, $C(O)NH_2$, $C(O)NH(CH_2)_nCH_3$, wherein n is an integer from 0 to 3, and $C(O)N[(CH_2)_nCH_3](CH_2)_mCH_3$, wherein n and m independently are integers from 0 to 3; and $R^4$ is $[(CH_2)_a(CHX)_b(CYZ)_c]$, wherein X, Y and Z are independently selected from the group consisting of hydrogen, halogen, $C_1$-$C_4$ alkyl, $C_1$-$C_4$ alkoxy, $C_1$-$C_{10}$ aryl, and $C_1$-$C_{10}$ aryloxy, and a, b, and c independently are integers from 0 to 6 satisfying the condition that (a+b+c) equals an integer from 2 to 6.

46. The method of claim 39, wherein the cyclic silazane is represented by the following formula:

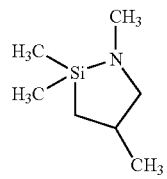

47. The method of claim 39, wherein the hydrophobicity-imparting agent is propyltrimethoxysilane.

48. The method of claim 39, wherein the reaction mixture contains a water-miscible organic solvent.

49. The method of claim 39, wherein the reaction mixture contains no organic solvent.

50. The method of claim 39, wherein the reaction mixture contains no organic surface-active agent.

51. The method of claim 39, wherein the agglomerate particle size of the silica particles is reduced after the dispersion is dried.

52. The method of claim 39, wherein the silica particles are colloidal silica particles.

53. The composition of claim 2, wherein the cyclic silazane is represented by the following formula:

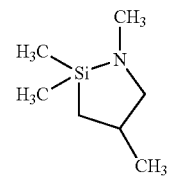

54. The composition of claim 2, wherein the hydrophobicity-imparting agent is a trialkoxysilane compound.

55. The composition of claim 54, wherein the trialkoxysilane compound is propyltrimethoxysilane.

56. The composition of claim 16, wherein the hydrophobicity-imparting agent is propyltrimethoxysilane.

57. The composition of claim 17, wherein the hydrophobicity-imparting agent is propyltrimethoxysilane.

58. The toner composition of claim 20, wherein the hydrophobicity-imparting agent is propyltrimethoxysilane.

59. The toner composition of claim 21, wherein the hydrophobicity-imparting agent is propyltrimethoxysilane.

60. The toner composition of claim 36, wherein the hydrophobicity-imparting agent is propyltrimethoxysilane.

61. The toner composition of claim 37, wherein the hydrophobicity-imparting agent is propyltrimethoxysilane.

62. The method of claim 40, wherein the hydrophobicity-imparting agent is propyltrimethoxysilane.

63. The method of claim 41, wherein the hydrophobicity-imparting agent is propyltrimethoxysilane.

\* \* \* \* \*

UNITED STATES PATENT AND TRADEMARK OFFICE
CERTIFICATE OF CORRECTION

PATENT NO. : 8,455,165 B2
APPLICATION NO. : 11/774494
DATED : June 4, 2013
INVENTOR(S) : Fomitchev et al.

It is certified that error appears in the above-identified patent and that said Letters Patent is hereby corrected as shown below:

In the Claims:

Column 24, line 17, the formula "$C(O)N[(CH_2)_nCH_3]CH_2)_mCH_3$" should read $C(O)N[(CH_2)_nCH_3](CH_2)_mCH_3$ Signed and Sealed this
Third Day of September, 2013

Teresa Stanek Rea
*Acting Director of the United States Patent and Trademark Office*